United States Patent
Wheeler et al.

(10) Patent No.: US 11,747,455 B2
(45) Date of Patent: *Sep. 5, 2023

(54) CALIBRATING SENSORS MOUNTED ON AN AUTONOMOUS VEHICLE

(71) Applicant: NVIDIA Corporation, Santa Clara, CA (US)

(72) Inventors: Mark Damon Wheeler, Saratoga, CA (US); Lin Yang, San Carlos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,526

(22) Filed: Jun. 28, 2022

(65) Prior Publication Data

US 2022/0329715 A1    Oct. 13, 2022

Related U.S. Application Data

(63) Continuation of application No. 16/538,802, filed on Aug. 12, 2019, now Pat. No. 11,375,119, which is a
(Continued)

(51) Int. Cl.
*G01S 7/497* (2006.01)
*G01S 17/87* (2020.01)
(Continued)

(52) U.S. Cl.
CPC .......... *G01S 7/497* (2013.01); *G01C 21/1652* (2020.08); *G01C 21/3602* (2013.01);
(Continued)

(58) Field of Classification Search
CPC ...... G01S 7/497; G01S 7/4817; G01S 7/4972; G01S 17/42; G01S 17/86; G01S 17/87;
(Continued)

(56) References Cited

U.S. PATENT DOCUMENTS 9,052,721 B1    6/2015  Dowdall et al.
9,097,800 B1 *  8/2015  Zhu .................. G01S 13/931
(Continued)

FOREIGN PATENT DOCUMENTS

CN    102447911 A      5/2012
CN    103308923 A  *   9/2013  ............. G01S 17/58
(Continued)

OTHER PUBLICATIONS

He et al.; Calibration Method for Multiple 2D LIDARs System; 2014 IEEE International Conference on Robotics & Automation (ICRA) Hong Kong Convention and Exhibition Center May 31-Jun. 7, 2014. Hong Kong, China; pp. 3034-3041 (Year: 2014).*

(Continued)

*Primary Examiner* — Michael J Zanelli
(74) *Attorney, Agent, or Firm* — Maschoff Brennan

(57) ABSTRACT

A system calibrates one or more sensors mounted to an autonomous vehicle. From the one or more sensors, the system identifies a primary sensor and a secondary sensor. The system determines a reference angle for the primary sensor, and based on that reference angle for the primary sensor, a scan-start time representing a start of a scan and a scan-end time representing an end of a scan. The system receives, from the primary sensor, a primary set of scan data recorded from the scan-start time to the scan-end time. The system receives, from the secondary sensor, a secondary set of sensor data recorded from the scan-start time to the scan-end time. The system calibrates the primary and secondary sensors by determining a relative transform for transforming points between the first set of scan data and the second set of scan data.

18 Claims, 20 Drawing Sheets

Related U.S. Application Data continuation of application No. 16/161,035, filed on Oct. 15, 2018, now Pat. No. 10,436,885.

(60) Provisional application No. 62/574,744, filed on Oct. 19, 2017.

(51) Int. Cl.

| | |
|---|---|
| *G01S 17/86* | (2020.01) |
| *G01S 17/931* | (2020.01) |
| *G01C 21/16* | (2006.01) |
| *H04N 23/68* | (2023.01) |
| *H04N 23/60* | (2023.01) |
| *G01S 17/89* | (2020.01) |
| *G05D 1/02* | (2020.01) |
| *G06T 7/80* | (2017.01) |
| *G06T 7/13* | (2017.01) |
| *G01S 17/42* | (2006.01) |
| *G01S 7/481* | (2006.01) |
| *G05D 1/00* | (2006.01) |
| *G06T 7/55* | (2017.01) |
| *G06T 7/33* | (2017.01) |
| *G01C 21/36* | (2006.01) |
| *H04N 5/04* | (2006.01) |
| *H04N 13/106* | (2018.01) |
| *G06V 20/56* | (2022.01) |
| *H04N 23/54* | (2023.01) |
| *H04N 23/90* | (2023.01) |
| *B60R 1/00* | (2022.01) |

(52) U.S. Cl.
CPC .......... *G01S 7/4817* (2013.01); *G01S 7/4972* (2013.01); *G01S 17/42* (2013.01); *G01S 17/86* (2020.01); *G01S 17/87* (2013.01); *G01S 17/89* (2013.01); *G01S 17/931* (2020.01); *G05D 1/0088* (2013.01); *G05D 1/0231* (2013.01); *G05D 1/0248* (2013.01); *G06T 7/13* (2017.01); *G06T 7/33* (2017.01); *G06T 7/55* (2017.01); *G06T 7/80* (2017.01); *H04N 5/04* (2013.01); *H04N 13/106* (2018.05); *H04N 23/60* (2023.01); *H04N 23/689* (2023.01); *B60R 1/00* (2013.01); *G05D 1/0287* (2013.01); *G05D 2201/0213* (2013.01); *G06T 2207/10028* (2013.01); *G06T 2207/10048* (2013.01); *G06T 2207/20092* (2013.01); *G06T 2207/20221* (2013.01); *G06T 2207/30241* (2013.01); *G06T 2207/30242* (2013.01); *G06T 2207/30252* (2013.01); *G06V 20/56* (2022.01); *H04N 23/54* (2023.01); *H04N 23/90* (2023.01)

(58) Field of Classification Search
CPC ... G01S 17/89; G01S 17/931; G01C 21/1652; G01C 21/3602; G05D 1/0088; G05D 1/0231; G05D 1/0248; G06T 7/13; G06T 7/33; G06T 7/55; G06T 7/80; H04N 5/04; H04N 13/106; H04N 23/60
See application file for complete search history.

(56) References Cited

U.S. PATENT DOCUMENTS

| | | | |
|---|---|---|---|
| 9,625,582 | B2 * | 4/2017 | Gruver ................. G01S 7/4815 |
| 10,241,198 | B2 | 3/2019 | LaChapelle et al. |
| 2006/0125679 | A1 | 6/2006 | Horibe |
| 2007/0291130 | A1 | 12/2007 | Broggi et al. |
| 2010/0235129 | A1 | 9/2010 | Sharma et al. |
| 2010/0253540 | A1 | 10/2010 | Seder et al. |
| 2012/0081544 | A1 | 4/2012 | Wee |
| 2013/0242285 | A1 | 9/2013 | Zeng |
| 2014/0049765 | A1 | 2/2014 | Zheleznyak et al. |
| 2014/0159925 | A1 | 6/2014 | Mimeault et al. |
| 2014/0160291 | A1 | 6/2014 | Schaffner |
| 2015/0254781 | A1 | 9/2015 | Binion et al. |
| 2016/0018524 | A1 | 1/2016 | Zeng |
| 2016/0209846 | A1 | 7/2016 | Eustice et al. |
| 2017/0124781 | A1 | 5/2017 | Douillard et al. |
| 2017/0242442 | A1 | 8/2017 | Minster |
| 2017/0287335 | A1 | 10/2017 | Ansari |
| 2019/0011927 | A1 | 1/2019 | Mou |

FOREIGN PATENT DOCUMENTS

| | | | |
|---|---|---|---|
| CN | 104574376 | A | 4/2015 |
| CN | 106228537 | A | 12/2016 |
| GB | 2507560 | A | 5/2014 |
| KR | 10-1473736 | B1 | 12/2014 |
| WO | WO-2013045927 | A1 * | 4/2013 .............. G01S 17/02 |

OTHER PUBLICATIONS

Eggert, D.W. et al., Estimating 3-D rigid body transformations: a comparison of four major algorithms, Machine Vision and Applications, 1997, pp. 272-290.
Levinson, J. et al., "Automatic Online Calibration of Cameras and Lasers," Robotics: Science and Systems, Jun. 24-28, 2013, pp. 1-8.
Levinson, J. et al., "Towards Fully Autonomous Driving: Systems and Algorithms," IEEE Intelligent Vehicles Symposium (IV) 2011, pp. 1-6.
Lorusso, A. et al., "A Comparison of Four Algorithms for Estimating 3-D Rigid Transformations," British Machine Vision Conference, 1995, pp. 237-246.
Park, Y. et al., "Calibration between Color Camera and 3D Lidar Instruments with a Polygonal Planar Board," Sensors 14, Mar. 17, 2014, pp. 5333-5353.
PCT International Search Report and Written Opinion, PCT Application No. PCT/US18/55964, dated Jan. 8, 2019, 11 pages.
PCT International Search Report and Written Opinion, PCT Application No. PCT/US2018/056367, dated Jan. 11, 2019, nine pages.
PCT International Search Report and Written Opinion, PCT Application No. PCT/US18/55940, dated Nov. 28, 2018, two pages.
Pusztai, Z., et al., Accurate Calibration of LIDAR-Camera Systems using Ordinary Boxes, IEEE International Conference on Computer Vision Workshops, Oct. 22-29, 2017, pp. 394-402.
Segal, A.V. et al., "Generalized-ICP," Robotics: Science and Systems, Jun. 2009, pp. 1-8.
Sivaraman, S. et al., Looking at Vehicles on the Road: A Survey of Vision-Based Vehicle Detection, Tracking, and Behavior Analysis, IEEE Transactions on Intelligent Transportation Systems, vol. 14, No. 4, Dec. 2013, pp. 1773-1795.
United States Office Action, U.S. Appl. No. 16/161,035, filed Apr. 25, 2019, eight pages.
Velas, M. et al. "Calibration of RGB Camera With Velodyne LiDAR," 2014, pp. 1-10.
United States Notice of Allowance, U.S. Appl. No. 16/538,802.
CN Office Action dated Feb. 11, 2023 as received in Application No. 201880081684.9.

* cited by examiner

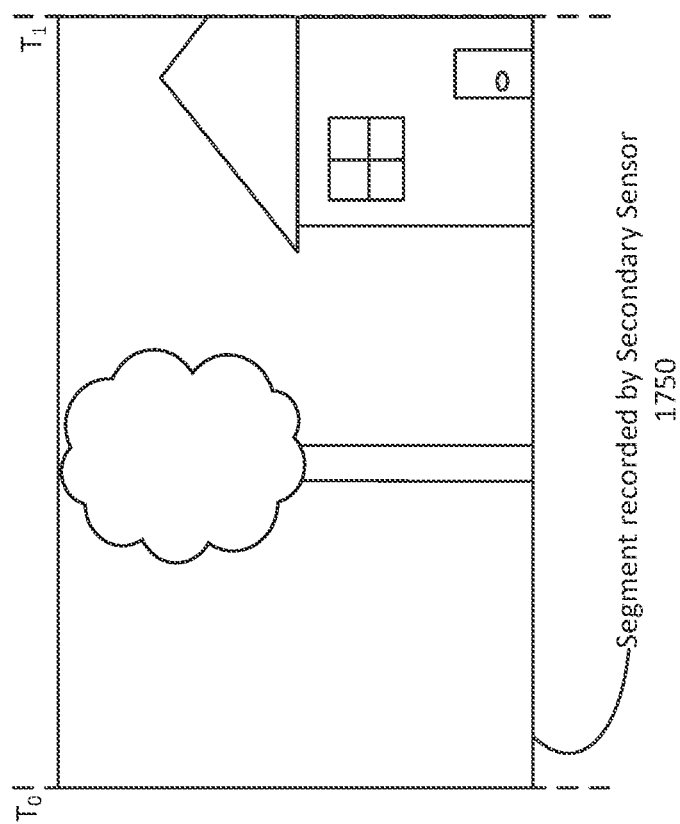
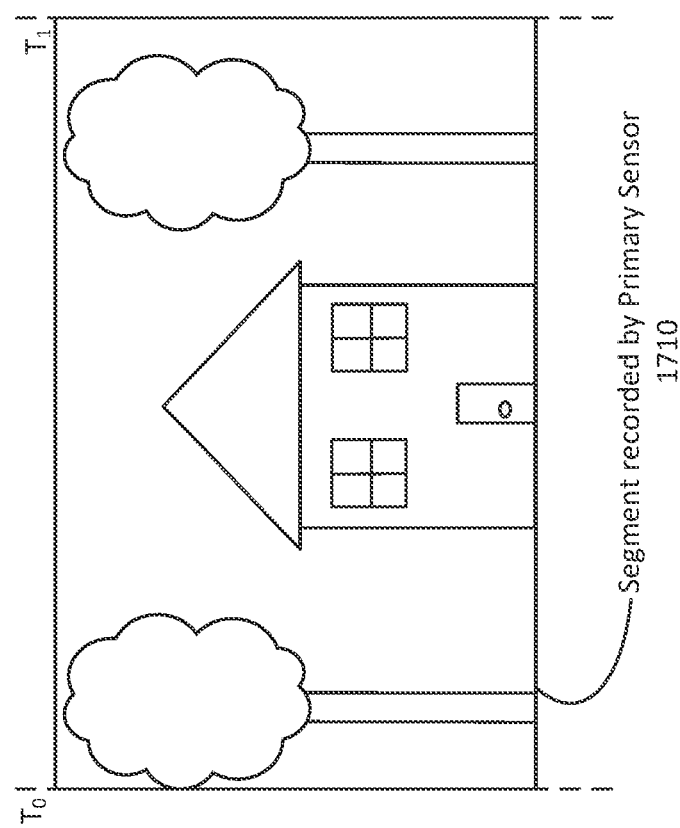
FIG. 17B

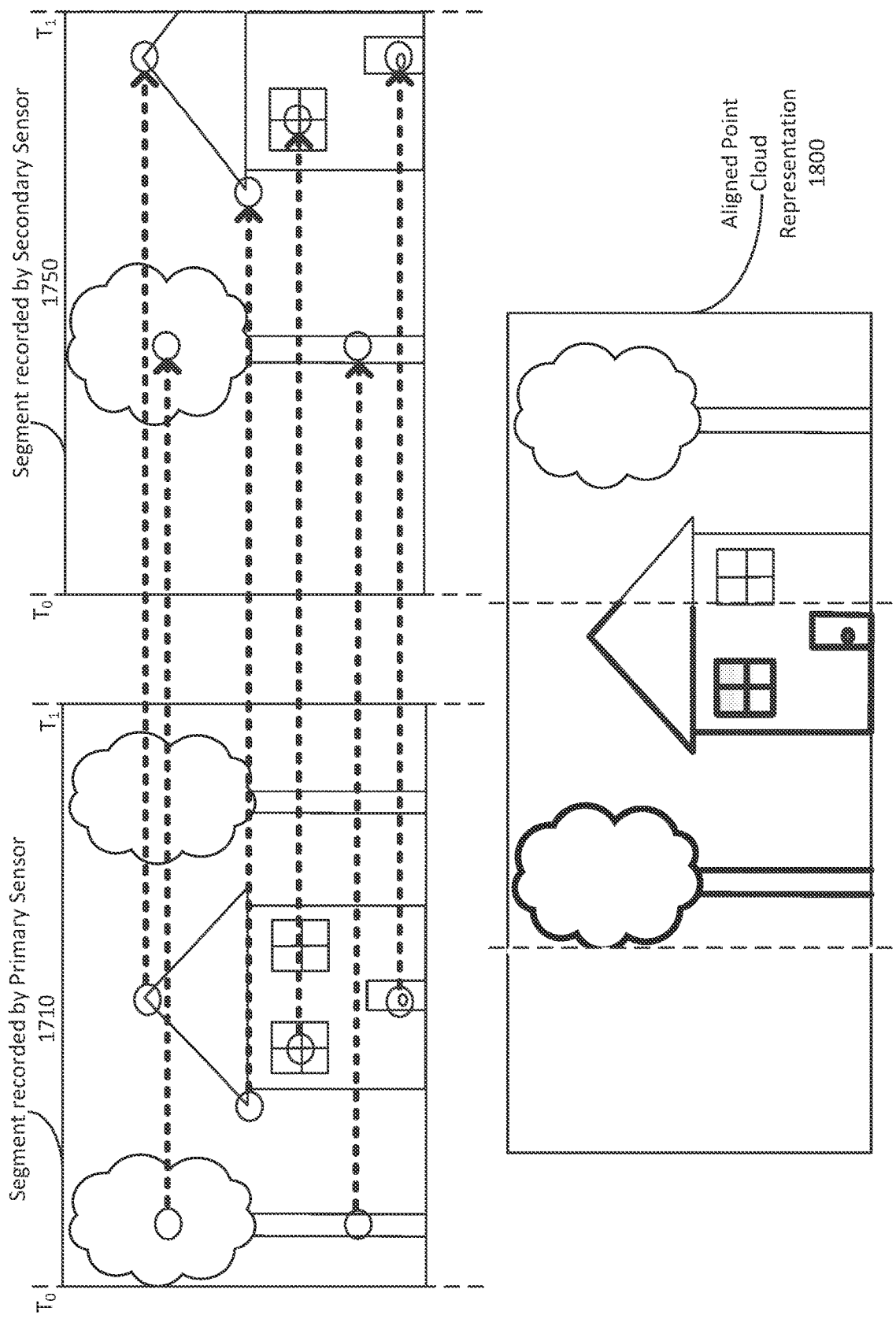

CALIBRATING SENSORS MOUNTED ON AN AUTONOMOUS VEHICLE

CROSS REFERENCE TO RELATED APPLICATIONS

This application is a continuation of U.S. patent application Ser. No. 16/538,802 filed on Aug. 12, 2019, now U.S. Pat. No. 11,375,119, which is a continuation of U.S. patent application No. 16/161,035 filed on Oct. 15, 2018, now U.S. Pat. No. 10,436,885, which claims priority to U.S. Provisional Patent Application No. 62/574,744 filed on Oct. 19, 2017, the disclosures of each of which are hereby incorporated herein by this reference in their entireties.

BACKGROUND

This disclosure relates generally to calibrating sensors mounted on a vehicle, for example, an autonomous vehicle, and more particularly to calibrating sensors mounted on a vehicle by aligning scan data recorded by multiple sensors.

Autonomous vehicles, also known as self-driving cars, driverless cars, auto, or robotic cars, drive from a source location to a destination location without requiring a human driver to control and navigation the vehicle. The instructions for guiding the autonomous vehicle through a route are generated based on data received from one or more sensors mounted on the autonomous vehicle. Sensors mounted on a vehicle may drift over time, for example, as a result of temperature, vibrations of the vehicle, and so on. This causes sensor parameters to change over time. For example, for sensors which collect data describing the surrounding environment by rotating about a vertical axis, each sensor may begin their rotational cycle at a different starting orientation or angle. As a result, the environment recorded by each sensor during a single cycle may be shifted between sensors. Alternatively, some aspects of the surrounding environment may be excluded in some recordings, but included in others. In order to generate a complete representation of the surrounding environment, there exists a need for calibrating each sensor relative to each of the other sensors to correct for inconsistencies in their alignments.

SUMMARY

A vehicle computing system calibrates sensors mounted on an autonomous vehicle for data collection and localization. A vehicle identifies from a plurality of sensors mounted on the autonomous vehicle a primary sensor and identifies the remaining sensors as secondary sensors. The vehicle computing system determines a reference angle for the primary LIDAR sensor and, based on the reference angle, a scan-start time and a scan-end time. The scan-start time indicates the start of a segment of data recorded by a sensor and the scan-end time indicates the end of a segment of data recorded by a sensor. As the sensors rotate over a vertical axis, each sensor records a scan of the surrounding area with time labels indicating when recording of the scan began and when the recording ended. The vehicle computing system receives a set of primary scan data recorded between the scan-start time and the scan-end time by the primary sensor and a set of secondary scan data recorded between the scan-start time and the scan-end time by each secondary sensor.

Using the primary scan data and the secondary scan data, the system calibrates the plurality of sensors by determining a relative transform for transforming points between the primary scan data and the secondary scan data. Calibrating each sensor mounted on the autonomous vehicle to synchronize the entire sensor system ensures that the computing system is able to align the scan data collected by each sensor, for example based on common landmarks within each scan. The vehicle is localized using scan data recording by all sensor mounted on the vehicle simultaneously at a regular time interval ranging from a start time to an end time. The vehicle computing system ensures that scan data received from different sensors are recorded between a common start time and stop time. As a result, the scan data recorded by multiple sensors may share the same unwinding transform which facilitates both the alignment and localization of scan data. The vehicle computing system generates a high definition map by aggregating the scan data using the relative transform and sends signals to the controls of the autonomous vehicle based on the high-definition map.

Embodiments of the invention allow calibration of sensors of vehicles without requiring extensive manual setup or operation. As a result, sensors of vehicles can be calibrated on a regular basis. This allows accurate correlation of data obtained by different sensors for combining the data. Since high definition maps are generated by combining data captured by different sensors, embodiments of the invention improve the quality of maps generated as well as efficiency with which they are generated.

Although embodiments are described in connection with calibration of sensors mounted on autonomous vehicles, the techniques disclosed herein can be applied to other scenarios, for example, for sensors mounted on any vehicle or on a robot.

BRIEF DESCRIPTION OF THE DRAWINGS

FIG. 17B illustrates a representation of two segments of scan data recorded by sensors rotating at different rotational frequencies, according to an embodiment.

FIG. 18 illustrates an example alignment of two segments of scan data recorded by sensors rotating at different rotational frequencies, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

General System Architecture

Figure 1:
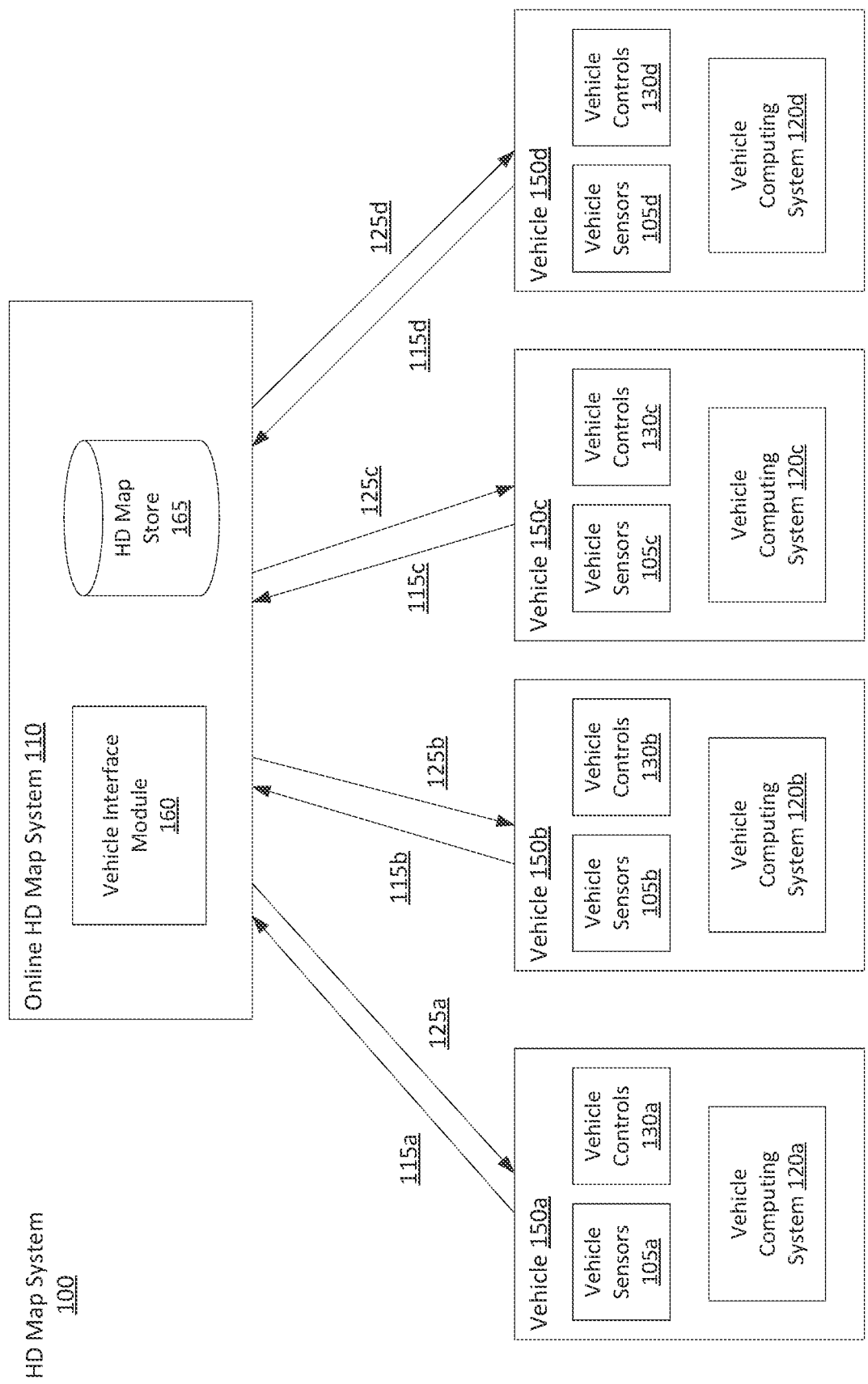
FIG. 1 shows the overall system environment of an HD map system interacting with multiple vehicle computing systems, according to an embodiment.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
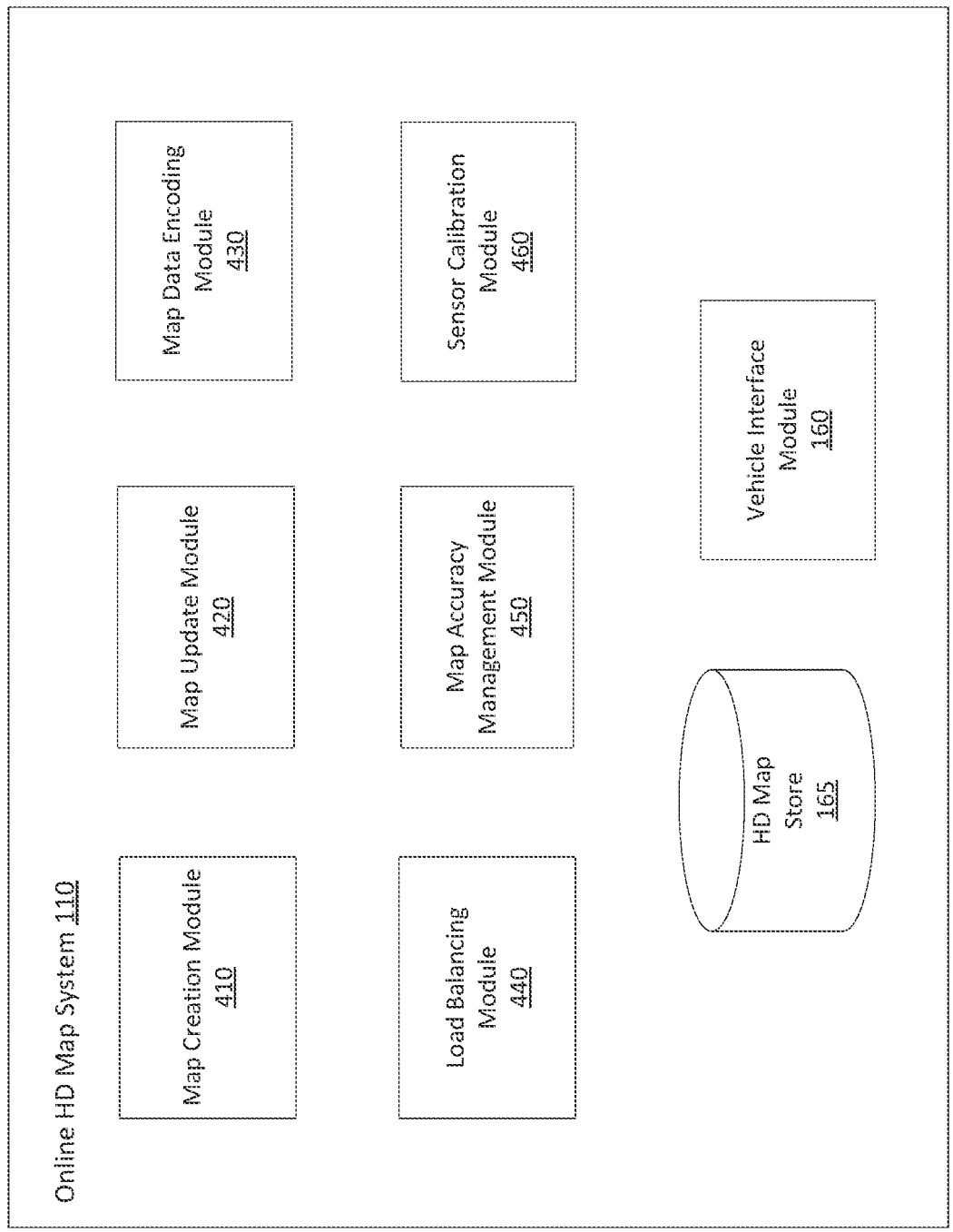
FIG. 4 shows the system architecture of an online HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. A vehicle sensor 105 may be any sensor mounted on a vehicle that captures data describing the environment. The sensor may be a sensor that performs rotations to capture environment data. Examples of vehicle sensors 105 include, but are not limited to, a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
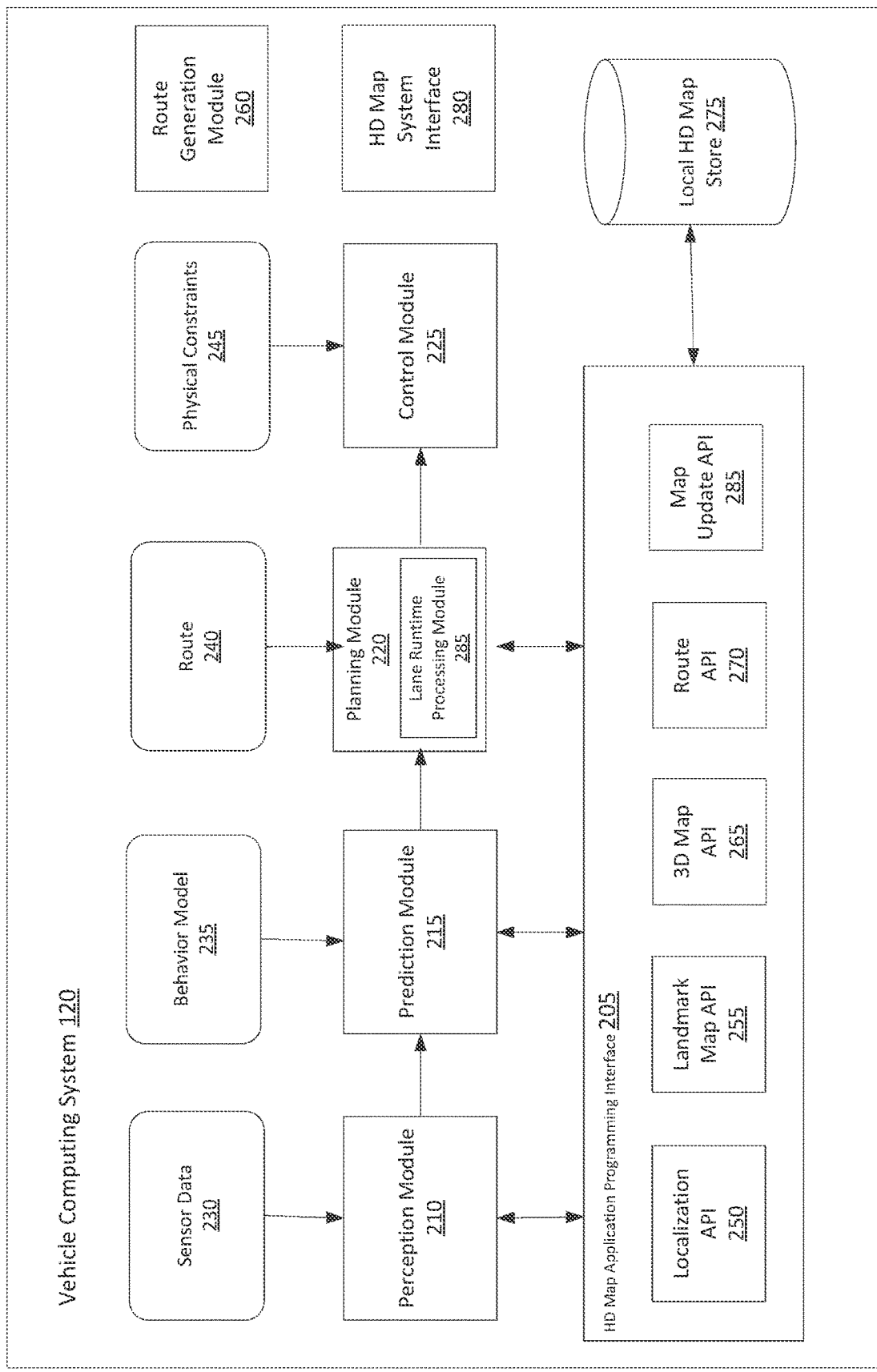
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, a route generation module 260, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 220 to plan the subsequent actions that the vehicle needs to take next.

The planning module 220 receives the information describing the surroundings of the vehicle from the prediction module 215, the route 240 that determines the destination of the vehicle, and the path that the vehicle should take to get to the destination. The planning module 220 uses the information from the prediction module 215 and the route 240 to plan a sequence of actions that the vehicle needs to take within a short time interval, for example, within the next few seconds. In an embodiment, the planning module 220 specifies the sequence of actions as one or more points representing nearby locations that the vehicle needs to drive through next. The planning module 220 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on. To process real-time data from the surroundings of the vehicle, the planning module 220 further includes a lane runtime processing module 285 to determine whether the vehicle can safely cross lane boundaries and travel over surfaces outside of the lane boundaries. Navigating lane boundaries is further described below in reference to FIG. 9A-B. In one embodiment, based on the surroundings of the autonomous vehicle, the prediction module 215 detects an emergency that would force the autonomous vehicle out of a lane and notifies the planning module 220 of the emergency. The lane runtime processing module determines that the vehicle can safely travel outside of the lane boundaries and signals to the control module 225.

The control module 225 determines the control signals for sending to the controls 130 of the vehicle based on the plan received from the planning module 220. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 265 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs 265 also include map update APIs 285, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 265 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its 14 L value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

Figure 15:
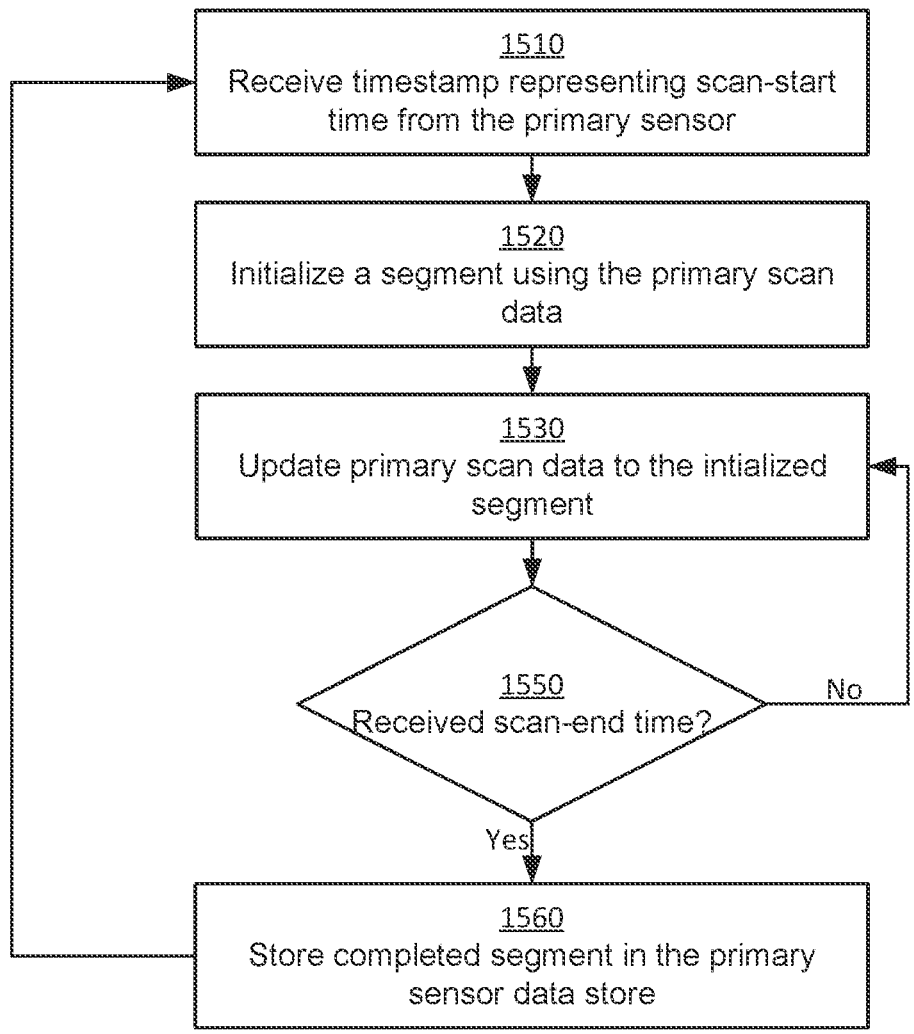
FIG. 15 illustrates a flow chart of the process for receiving and storing primary scan data, according to an embodiment.

The route generation module 260 computes and determines the optimal route traversing from a source address (or source location) to a destination address (or destination location). Details of the route generation module are shown in FIG. 15 described in relation with FIG. 16. Some functionality of the route generation module 260 may be performed in the online HD map system 110. Accordingly, the online HD map system 110 may store a corresponding route generation module 260 that interacts with the route generation module 260 stored in the vehicle computing system 120.

FIG. 4, described below, further illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
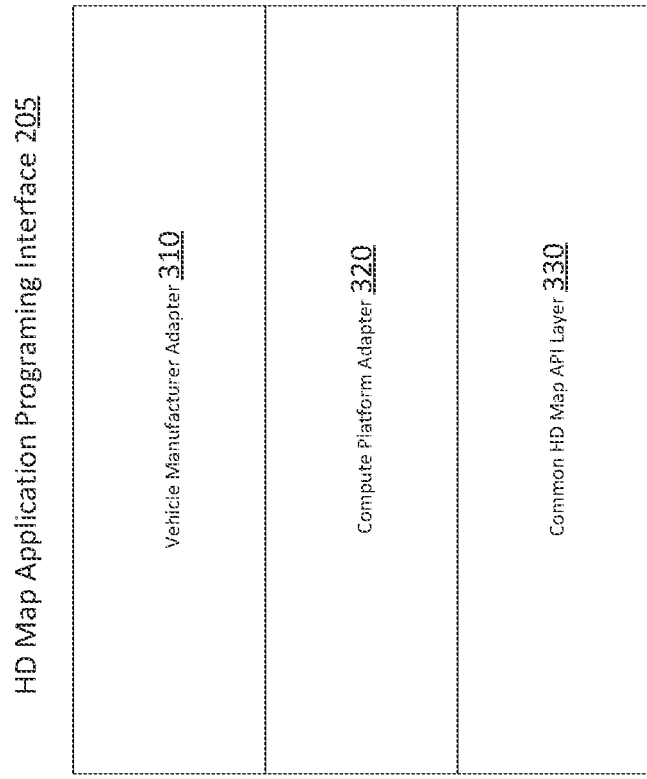
FIG. 3 illustrates the various layers of instructions in the HD Map API of a vehicle computing system, according to an embodiment.

As shown in FIG. 3, in an embodiment, the HD map API 205 is implemented as a library that includes a vehicle manufacturer adapter 310, a compute platform adapter 320, and a common HD map API layer 330. The common HD map API layer 330 comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of computer platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module 450, a sensor calibration module 460, a vehicle interface module 160, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 9:
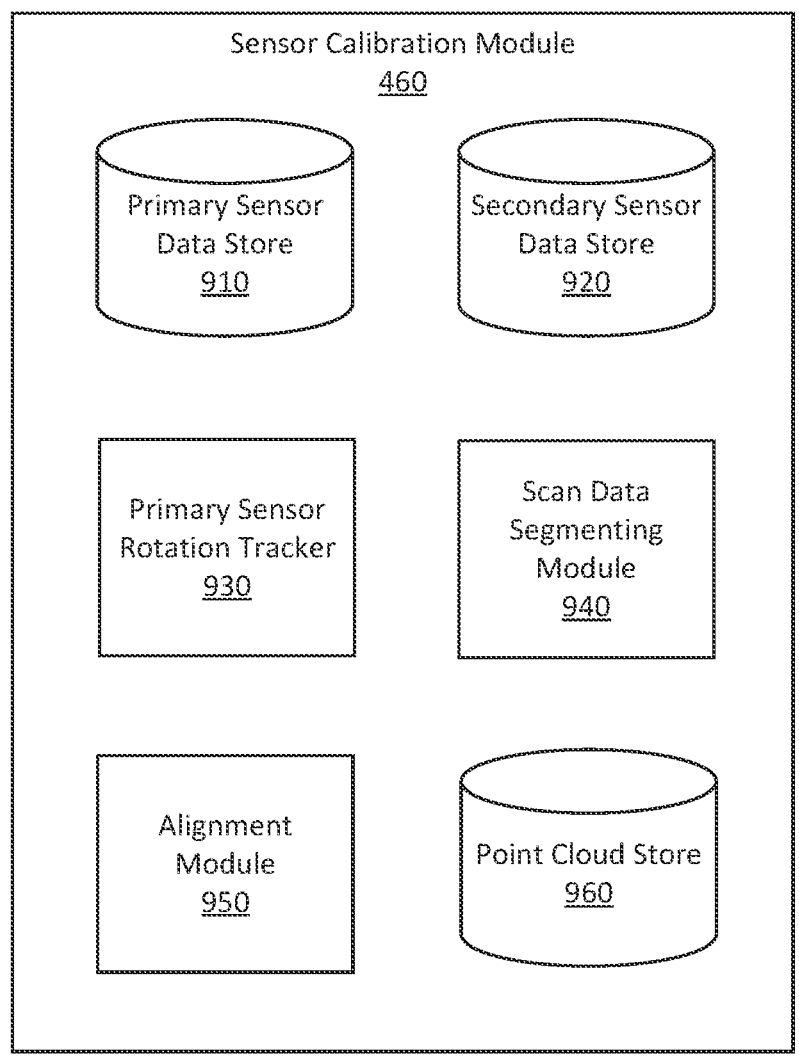
FIG. 9 shows the system architecture of the calibration module, according to an embodiment.

The sensor calibration module 460 synchronizes the rotation of the plurality of sensors mounted to the autonomous vehicle to determine a relative transform between scan data and aggregate the scan data from multiple sensors to generate a complete view of the environment surroundings. Details of the sensor calibration module 460 are shown in FIG. 9 and described with reference to FIGS. 9-15. Some functionality of the sensor calibration module 460 may be performed in the online HD map system 110. Accordingly, the online HD may system 110 may store a corresponding sensor calibration module 460 that interacts with the sensor calibration module 460 stored in the vehicle computing system 120.

Figure 5:
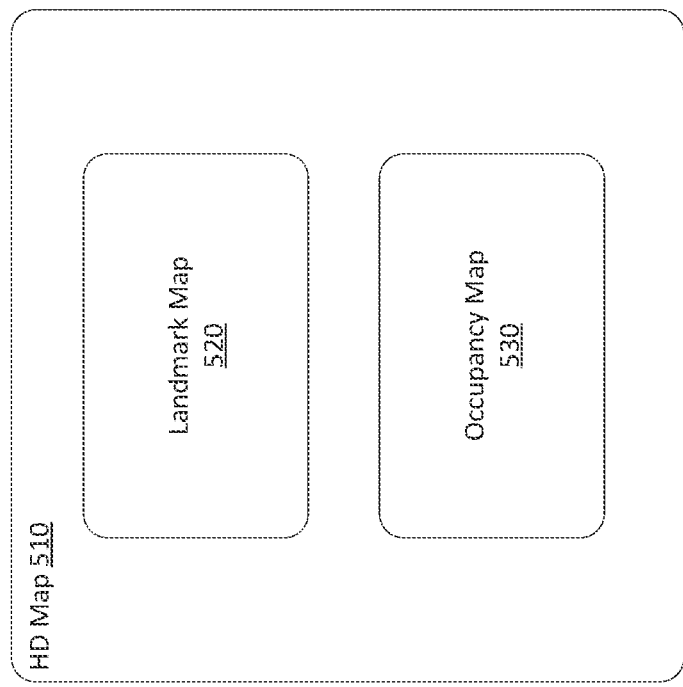
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of crosswalks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a physical area into geographical regions and stores a separate representation of each geographical region. Each geographical region represents a continuous physical area bounded by a geometric shape, for example, a square, a rectangle, a quadrilateral or a general polygon. In an embodiment, the online HD map system 110 divides a physical area into geographical regions of the same size independent of the amount of data required to store the representation of each geographical region. In another embodiment, the online HD map system 110 divides a physical area into geographical regions of different sizes based on the amount of data required to represent the geographical region. Examples of data required to represent the region include but are not limited to a geometric area encompassed by the region, a concentration of traffic features in the region, or a population density in the region. As mentioned, in some embodiments, geographical regions are divided based on their concentrations of traffic features. For example, a physical area with a large number of traffic features may be divided into multiple geographical regions, whereas a physical area of the same size with fewer traffic features may be represented as a single geographical region.

Traffic features include, but are not limited to, one or more traffic signs, one or more traffic lights, one or more driving lanes, and one or more changes in speed limit.

In some embodiments, a combination of traffic features may not only describe the concentration of features of the geographical region, but also the complexity of region. For example, a region containing multiple streets with, changes in speed limits may have fewer traffic features than a second region with the same amount of streets, but no changes in speed limits but more traffic lights. In this instance, the second street may be more concentrated, but the first street is more complex causing the region to be physically smaller than the second region. In some embodiments, the relative complexity ranking between features may differ between HD maps. Accordingly, in this embodiment, the online HD map system 110 determines the size of a geographical region based on an estimate of an amount of data required to store the various elements of the physical area relevant for the generation of an HD map.

In an embodiment, the online HD map system 110 represents a geographical region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6B:
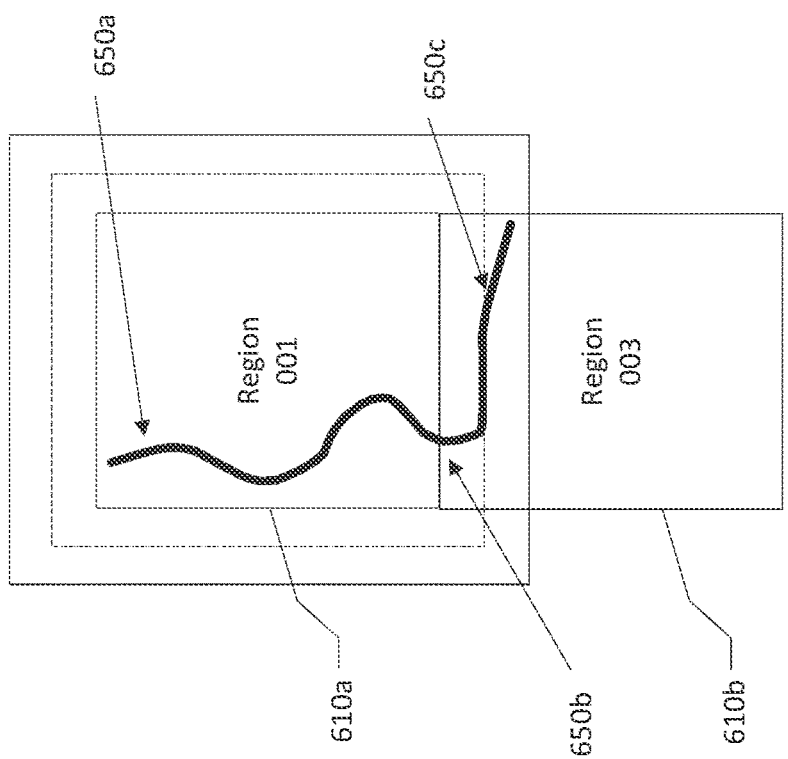
FIGS. 6A-B illustrate geographical regions defined in an HD map, according to an embodiment.
Figure 6A:
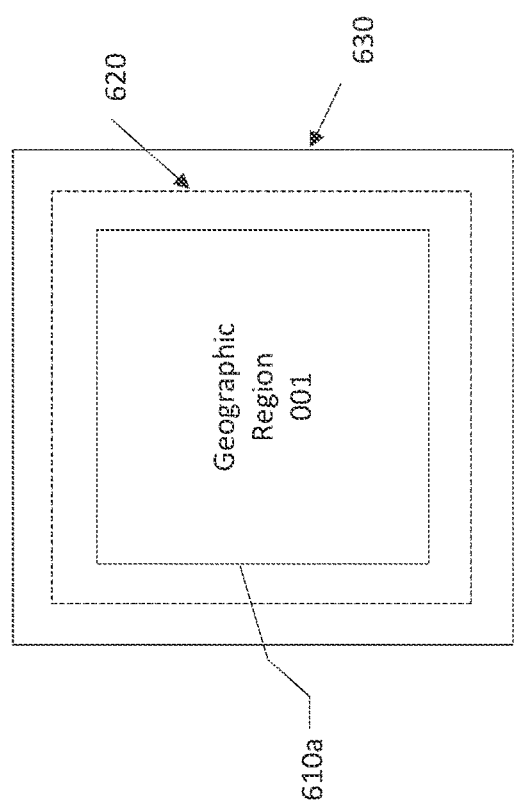

FIGS. 6A-B illustrate geographical regions defined in an HD map, according to an embodiment. FIG. 6A shows a square geographical region 610*a*. In other embodiments, the geographical regions may divided into different shapes of tiles. FIG. 6B shows two neighboring geographical regions 610*a* and 610*b*. The online HD map system 110 stores data in a representation of a geographical region that allows for smooth transition from one geographical region to another as a vehicle drives across geographical region boundaries.

According to an embodiment, as illustrated in FIG. 6, each geographical region has a buffer of a predetermined width around it. The buffer comprises redundant map data around all 4 sides of a geographical region (in the case that the geographical region is bounded by a rectangle). FIG. 6A shows a boundary 620 for a buffer of 50 meters around the geographical region 610*a* and a boundary 630 for buffer of 100 meters around the geographical region 610*a*. The vehicle computing system 120 switches the current geographical region of a vehicle from one geographical region to the neighboring geographical region when the vehicle crosses a threshold distance within this buffer. For example, as shown in FIG. 6B, a vehicle starts at location 650*a* in the geographical region 610*a*. The vehicle traverses along a route to reach a location 650*b* where it cross the boundary of the geographical region 610 but stays within the boundary 620 of the buffer. Accordingly, the vehicle computing system 120 continues to use the geographical region 610*a* as the current geographical region of the vehicle. Once the vehicle crosses the boundary 620 of the buffer at location 650*c*, the vehicle computing system 120 switches the current geographical region of the vehicle to geographical region 610*b* from 610*a*. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
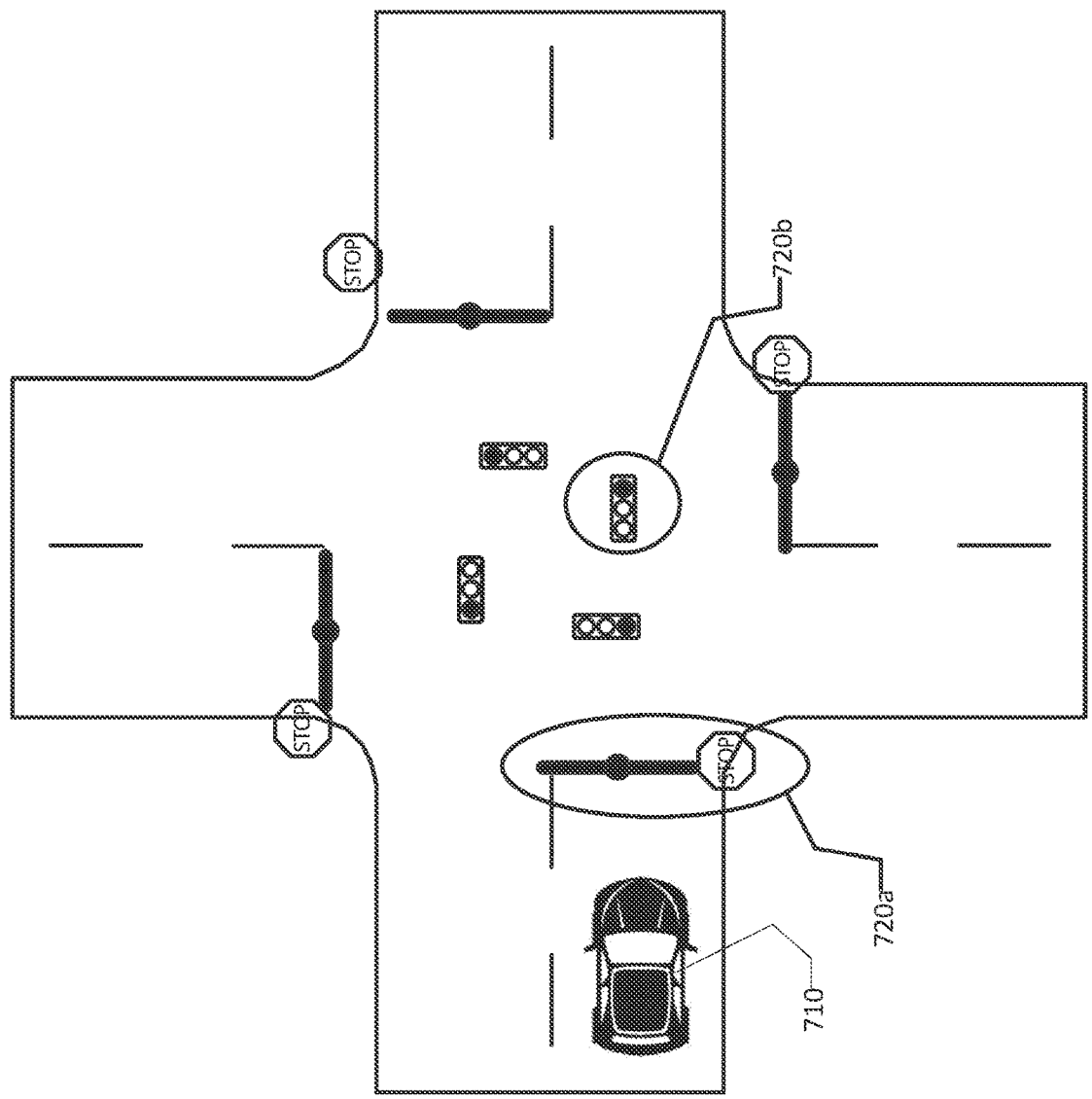
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

As described above lane elements are stored as pieces of an aggregated lane element graph. Within the lane element graph, individual lane elements are represented as nodes on the graph connected by edges to other nodes, representing neighboring lane elements of the graph. The edges connecting two lane elements indicate physical connection between two lane elements that a vehicle can legally traverse. For example, an edge between two lane elements may represent a dashed white line over which vehicles can change lanes, but may not represent a median over which vehicles do not legally cross. In some embodiments, boundaries between lane lines over which cars cannot cross have a representation distinct from the above edges of the lane element graph. Additionally, within geographical regions, lane elements transition from a current lane element to one or more subsequent lane elements, and a lane element can be connected to multiple outgoing lane elements, for example at an intersection where a vehicle may turn left, turn right, or continue straight from their current lane (each of these are lane elements). Similarly, crossing the boundary of two geographical regions and transitioning from the current geographical region to an adjacent one, the lane element of the current geographical region also transitions to the connecting lane element with the adjacent geographical region.

Figure 8A:
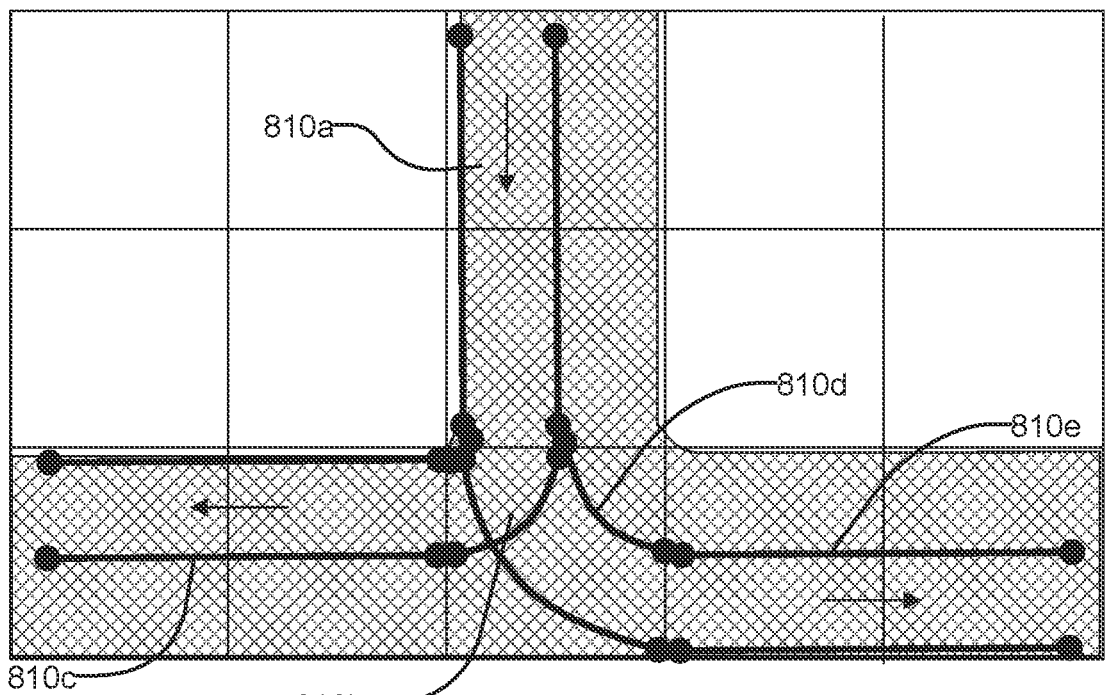
FIGS. 8A-B illustrate lane elements and relations between lane elements in an HD map, according to an embodiment.
Figure 8B:
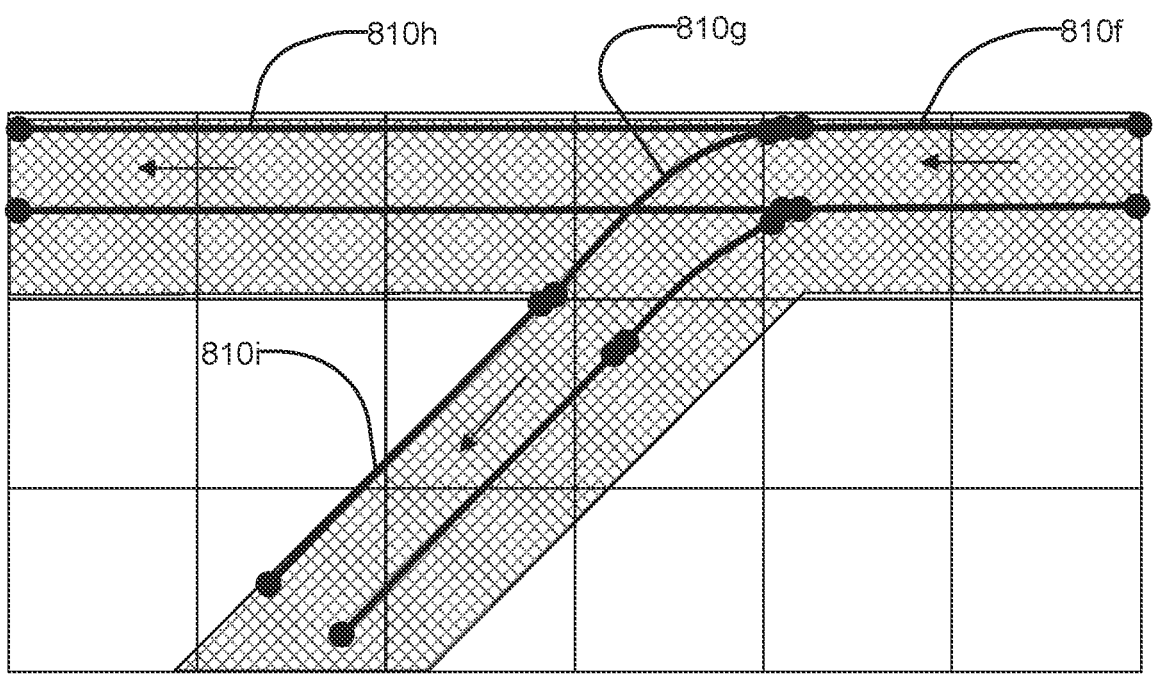

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Sensor Calibration

To calibrate the set of sensors mounted on a vehicle that record environmental data surrounding the vehicle, the HD map system 100 establishes boundary conditions defining the beginning and conclusion of rotations of the primary sensor's angle and uses those boundary conditions to identify relevant portions of scan data recorded by the secondary sensors. The environment surrounding the vehicle includes objects that are visible from the vehicle, for example, buildings, trees, traffic signs, other vehicles, street, and so on. FIG. 9 illustrates the system architecture of the sensor calibration module 460, according to an embodiment. The sensor calibration module 460 calibrates a plurality of sensors mounted on the autonomous vehicle in order to capture a representation of the environment surrounding the vehicle. The system architecture of the sensor calibration module 460 comprises a primary sensor data store 910, a secondary sensor data store 920, a primary sensor rotation tracker 930, a packet segmenting module 940, an alignment module 950, and an point cloud store 960. In other embodiments, the sensor calibration module 460 may include more or fewer modules. Functionality indicated as being performed by a particular module may be performed by other modules instead. Some of the modules of the sensor calibration module 460 may be stored in the HD map system 110.

To record data describing the environment surrounding the autonomous vehicle, multiple sensors are mounted to the vehicle to capture the surrounding environment. In one embodiment, the sensors are mounted such that they rotate 360° over a vertical axis. Examples of potential sensors include, but are not limited to, rolling shutter cameras, sonar sensors, or light detection and ranging (LIDAR) sensors. In embodiments in which the plurality of sensors are LIDAR sensors, each LIDAR sensor records an image of the environment as a point cloud. LIDAR sensors may include multiple lasers, for example 16-128 lasers, mounted on rotating platform. The lasers may be steered by adjusting the laser, adjusting a mirror integrated into the sensor, adjusting a lens of the sensor, or a combination thereof. Points of the point cloud are recorded over a period and are associate with timestamp at which the point was recorded. The LIDAR sensors may be rotational-based, with one or more lasers, may be solid state, r may have any of the characteristics described above.

The LIDAR sensors may produce point clouds with timestamps either stored or deliverable at each point. In one embodiment, the LIDAR sensors scan a fixed pattern using a fixed number of lasers by rotating, translating, and adjusting a combination of mirrors. LIDAR sensors in such an implementation may rotate 360° around an axis with a fixed or dynamic field of view, for example if the housing of the sensor is partially blocked. In alternate embodiments, the sensors may comprise a combination of any other rotational based sensors which record alternative representations of the surrounding environment. Of the set of sensors, the HD map system 100 identifies a single sensor as the primary sensor and the remaining sensors as secondary sensors. The data recorded by the primary sensor, often referred to as primary scan data, is stored within the primary sensor data store 910. The data recorded by each of the secondary sensors, often referred to as secondary scan data, is stored within the secondary data store 920. Primary and secondary sensors are further described with reference to FIGS. 11 and 12.

The primary sensor rotation tracker 930 tracks the continuous rotation of the primary sensor about the vertical axis over a period of time. The primary sensor rotation tracker 930 determines an initial orientation of the primary sensor, referred to herein as a "reference angle." In one embodiment, the reference angle is determined as the starting orientation of the primary sensor, whereas in other embodiments, the reference angle is a pre-determined orientation, for example, an orientation to which the primary sensor is set each time the autonomous vehicle begins to move. The reference angle may be determined based on a measurement recorded by the primary sensor rotation tracker 930. Alternatively, the reference angle may be assigned a pre-set orientation by a human operator. After completing a full 360° rotation, the sensor passes the reference angle indicating that a new rotation has begun. In some embodiments, the reference angle may be a fixed angle, for example 0°, and any data recorded before the primary sensor reaches the reference angle is discarded.

The primary sensor rotation tracker 930 records a timestamp or an alternative temporal label each time the primary sensor passes the reference angle and assigns timestamp to the data recorded during that rotations of the sensor. Accordingly, the scan data segmenting module 940 assigns a timestamp to the scan data recorded over a complete rotation which represents the scan-start time of the rotation. Because the second passing of the primary sensor over the reference angle indicates the conclusion of a first rotation and the beginning of a second rotation, in one embodiment, the scan data segmenting module 940 assigns the scan-start time of the second rotation as a label for the scan-end time of the first rotation. Accordingly, the scan-end time represents the conclusion of a rotation. In embodiments in which the primary or secondary sensors do not perform complete 360° rotations, the primary sensor rotation tracker 930 determines a boundary angle which represents the conclusion of a scan or adjusts the boundaries of the scan data using an alternative mechanism. The scan data segmenting module 940 may segment scan data recorded continuously by the primary sensor into data recorded over each full rotation of the primary sensor based on the assigned scan-start and scan-end times of each rotation. Scan data recorded by the primary sensor between a scan-start time and a scan-end time is stored in the primary sensor data store 910 as having been recorded between the scan-start time and the scan-end time. In alternate embodiments, scan data recorded over a single rotation of the primary sensor is stored in the primary sensor data store 910 and is only associated with a scan-start time.

For example, the primary sensor may be initialized to an orientation at a reference angle of 45°. As the automated vehicle begins moving the primary sensor begins rotating by moving past the 45° reference angle (i.e., from 45° to 46°, 47°, etc.). If the primary sensor begins rotating at 12:00:00 PM, 12:00:00 PM is assigned as the scan-start time. At 12:00:00.10 PM, the primary sensor rotates past the reference angle for a second time indicating the conclusion of the first rotation and the start of the second rotation. Accordingly, 12:00:00.10 PM is assigned as the scan-end time of the first rotation, the first set of primary scan data is labeled as being recorded between 12:00:00 PM and 12:00:00.10 PM, and the scan-start time of a second rotation is labeled as 12:00:00.10 PM.

Because each of the secondary sensors operate independently of the primary sensor or other secondary sensors, the starting orientation of each secondary sensor may differ from the reference angle of the primary sensor. For example, the reference angle of the primary sensor may be an angle of 45°, whereas the initial orientations of each secondary sensor may be different from 45°. The difference between initial orientations of each secondary sensor and the primary sensor may be a result of environmental conditions acting on the exterior of the autonomous vehicle, for example wind or precipitation, the orientations of the sensors at the conclusion of a previous trip, different rotational frequencies, or another cause.

If each secondary sensor has the same rotational frequency as the primary sensor, in the time required for the primary sensor to complete a full rotation, each secondary sensor also completes a full rotation. Accordingly, the scan-start and scan-end time assigned to scan data recorded by the primary sensor also describe the time required to for each secondary sensor to complete a full rotation. As described with reference to primary scan data, secondary scan data is also recorded by each secondary sensor with a timestamp or temporal marker indicating when the recording was performed. Similar to the primary sensor, each secondary sensor also rotates about the vertical axis continually while the car is in motion, resulting in a continuous set of scan data spanning several full rotations. The scan data segmenting module 940 accesses secondary scan data from the secondary sensor data store 920 and divides the accessed scan data into segments by matching the scan-start time and scan-end time of the corresponding rotation of the primary sensor or primary scan data to a temporal marker of the secondary scan data. Just as the primary sensor may record the times at which the primary sensor passes the reference angle, each secondary sensor also records times during which the secondary sensor is at various positions during its rotation. Secondary scan data may be stored within the secondary sensor data store 920 using similar labeling techniques described with reference to the primary sensor data store 910, for example labeling the segment with only the scan-start time or with both the scan-start and scan-end time. The segmenting of secondary scan data is further described with reference to FIGS. 13-16.

The alignment module 950 compares secondary scan data with primary scan data recorded over the same range of time and determines a relative transform between the primary scan data and secondary scan data. In embodiments in which the primary and secondary sensors are LIDAR sensors, the scan data resembles point clouds and the alignment module determines the relative transform between the scans of the primary and secondary sensors is determined using an iterative closest point technique, for example point-to-point ICP, point-to-plane ICP, or an alternate ICP technique. Because the primary scan data and the secondary scan data are both scans of the same surrounding environment, the alignment module 950 may detect common features between two the point clouds. Using the relative transform and the identified common features in each set of scan data, the alignment module 950 aligns primary scan data with secondary scan data to aggregate the two sets of scan data into a representation of the surrounding environment, for example, a point cloud representation. In such embodiments, the aligned point cloud is stored in the point cloud store 960. The alignment of primary scan data and secondary scan data is further described with reference to FIGS. 14-15.

In some embodiments, the sensors are calibrated by recording the surrounding environment while the autonomous vehicle is stationary. The sensor calibration module 460 may be implemented while the autonomous vehicle is at a variety of stationary positions to solve for a single set of 6 degrees of freedom parameters by aligning each scan of the stationary positions. In other embodiments, the sensors are calibrated while the autonomous vehicle is in motion to solve for the degree of freedom parameters. Point clouds recorded while the autonomous vehicle is in motion are subject to an unwinding transformation to compensate for the motion of the vehicle, before being aligned using an iterative closest point transform. In an embodiment, the HD map system calibrates the sensors in a controlled environment with a clearly defined floor, ceiling, and four visible walls within the overlapping region between the two sensors. The sensor calibration module 460 may simultaneously align each of the views such that all of the aforementioned surfaces are visible in the overlapping region.

Figure 10:
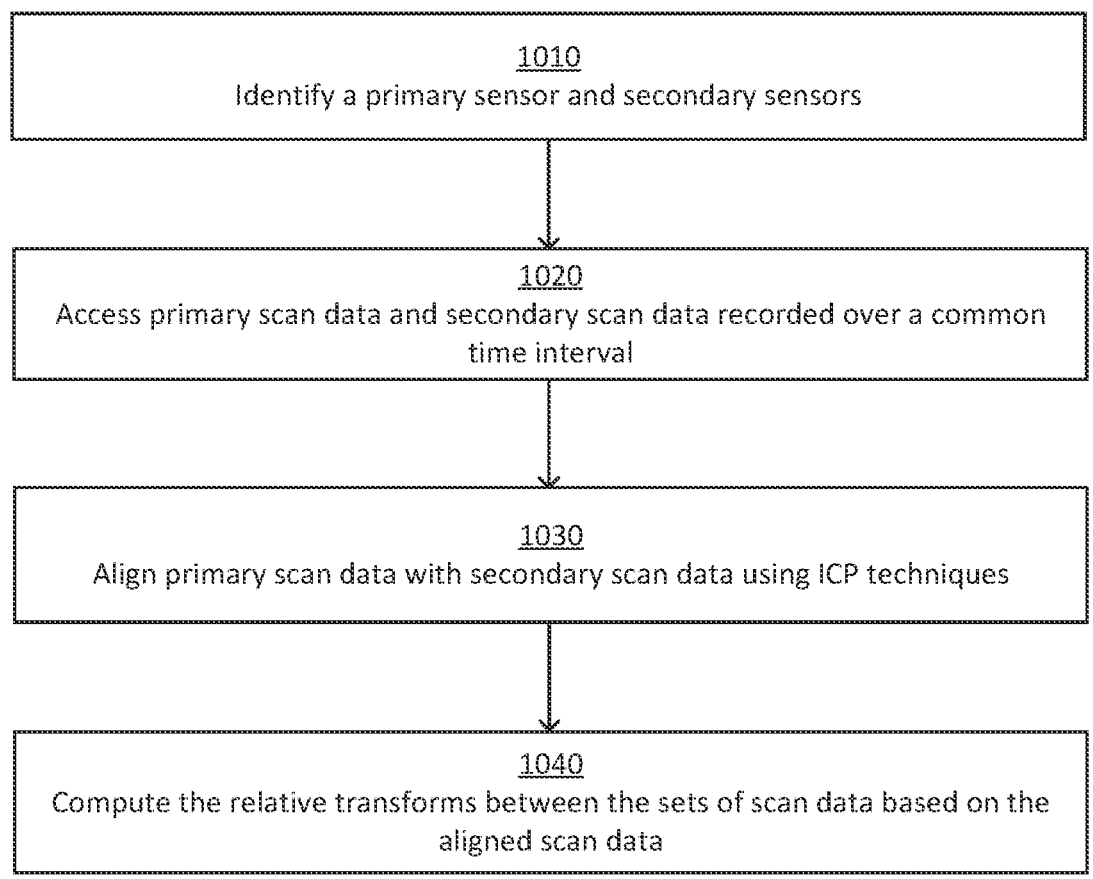
FIG. 10 illustrates a flow chart of the process for calibrating a set of sensors mounted to an autonomous vehicle, according to an embodiment.

FIG. 10 illustrates a flow chart of the process for calibrating a set of sensors mounted on a vehicle, according to an embodiment. The illustrated process is executed by the various components of the system architecture described with reference to FIG. 9. As described above, the calibration module 260 identifies 1010 a primary sensor and identifies the remaining sensors as secondary sensors. The primary sensor records scan data and stores the scan data in the primary sensor data store 910 while the secondary sensor records scan data and stored the scan data in the secondary sensor data store 920. The primary sensor rotation tracker 930 assigns scan-start times and/or a scan-end times to the stored primary scan data in order to segment the data into individual rotations of the primary sensor. The scan data segmenting module 940 segments secondary scan data recorded by each secondary sensor based on the scan-start and scan-end times assigned to the primary scan data resulting in segments of secondary scan data representative of a complete rotation of the secondary sensor. The alignment module 950 aligns 1030 the primary scan data with the secondary scan data based on a comparison of scan data recorded by the primary sensor and the secondary sensor using. In some embodiments in which the sensors record point-cloud representations of the environment, the alignment module 950 uses ICP (iterative closest point) techniques. Based on the alignment of the primary and secondary scan data, the alignment module 950 computes 1040 the relative transforms between the sets of scan data.

Primary Sensor Identification

Figure 11:
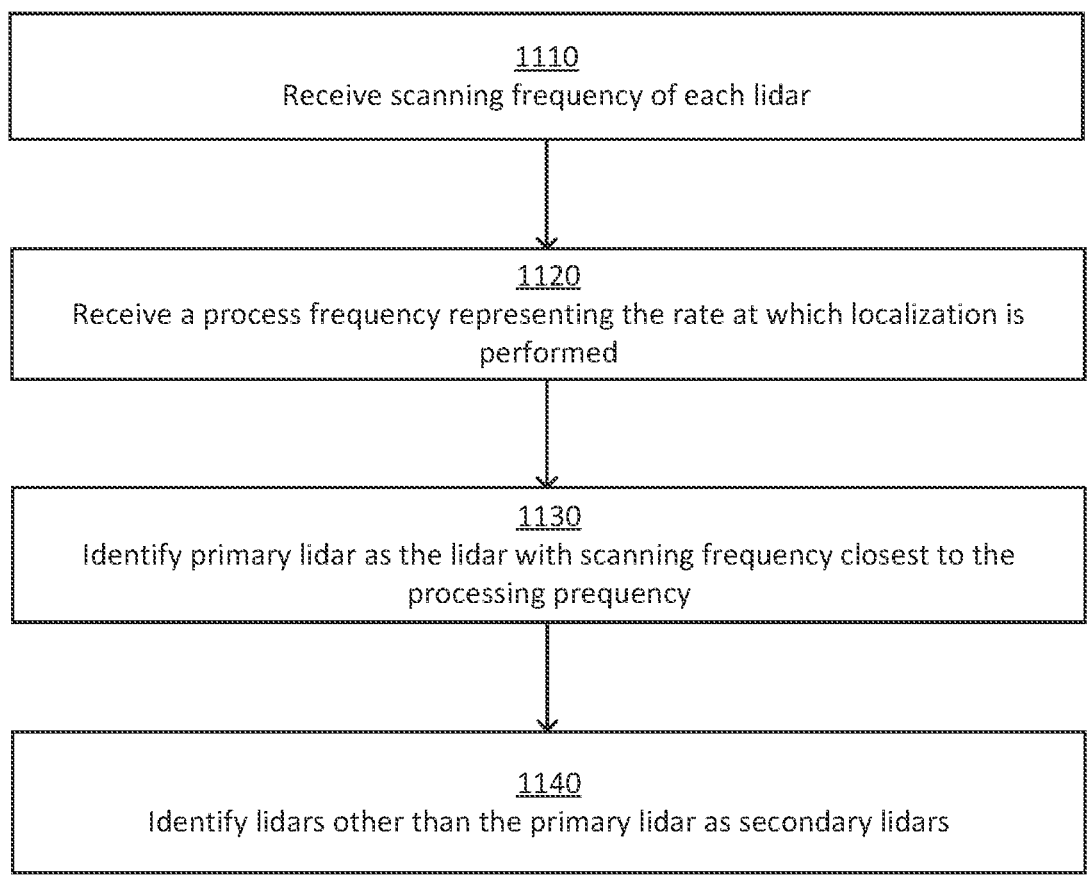
FIG. 11 illustrates a flow chart of the process for identifying primary and secondary sensors mounted to an autonomous vehicle, according to an embodiment.

To calibrate the set of sensors, the sensor calibration module 460 designates a single sensor as the primary sensor and the remaining sensors as secondary sensors. The primary sensor functions as the reference sensor against which scan data from each secondary sensor is compared to. FIG. 11 illustrates a flow chart of the process for identifying primary and secondary sensors mounted to an autonomous vehicle, according to an embodiment. The calibration module 260 receives 1110 a rotational frequency of each sensor, or the number of rotations performed by the sensor in a unit time. In embodiments in which one or more of the sensors may rotate at different frequencies, the calibration module 260 receives a processing frequency of the HD map system 100 which represents the rate at which the HD map system 100 performs localization of the autonomous vehicle. In the illustrated embodiment, the calibration module 260 identifies 1130 the sensor with a rotational frequency closest to the processing frequency of the HD map system 100 as the primary sensor. Because the processing frequency describes the rate at which the HD map system 100 performs localization for the autonomous vehicle, a primary sensor with a rotational frequency matching the rate at which the online HD map system 100 localizes, enables the online HD map system to update the location of the autonomous vehicle in real-time or near real-time. The calibration module 260 identifies 1140 the remaining sensors as secondary sensors. In one embodiment, the duration of time required to complete a single rotation aligns with the frequency of processing for most efficient results because the primary sensor dictates the duration of point clouds from all sensors.

For example, the online HD map system 100, executing at a localization processing frequency of 20 Hz, selects a primary sensor from sensors A, B, and C. If sensor A rotates at a frequency of 10 Hz, sensor B rotates at a frequency of 20 Hz, and sensor C rotates at a frequency of 10 Hz, the vehicle computing system 120 identifies sensor B as the primary sensor and sensors A and C as the secondary sensors. In an alternate embodiment, the primary sensor may be identified manually by an operator presented with each sensors processing frequency. In one embodiment, each of the sensors rotate at a common frequency, in which case the primary sensor may be randomly identified by the vehicle computing system 120 or manually identified by an operator.

In an alternate embodiment, the sensor identified as the primary sensor may have a lower rotation frequency than a secondary sensor. Accordingly, the secondary scan data may include an additional point cloud recorded beyond scan data for a single rotation. By aligning primary scan data and secondary scan data in time, the vehicle computing system 120 adjusts for discrepancies in the rotation frequencies between sensors. Additionally, given constraints in the internal clocks of the primary and secondary sensor, some secondary sensors may record additional data beyond one rotation even if the sensors have the same rotational frequencies, for example 10 Hz.

Segmenting of Scan Data

In some implementations, the primary sensor and secondary sensors may begin at different initial orientations or angles over a rotation relative to other sensors. In embodiments in which each sensor has an equivalent rotational frequency, if each sensor records a set of scan data over a complete rotation, each set of scan data will describe a 360° view of the same environment surrounding the autonomous vehicle. However, because each sensor began at a different initial angle, common features within each set of scan data may appear at different position within the recording. For example, a complete rotation of a primary sensor each secondary sensors requires 30 seconds (i.e., a scan-start time of 0:00:00 and a scan-end time 0:00:30). A feature, for example a tree recorded at 0:00:10 in the primary scan data may be recorded at 0:00:20 in a secondary scan data if the initial orientation of the secondary sensor was offset from the reference angle of the primary sensor.

Figure 12:
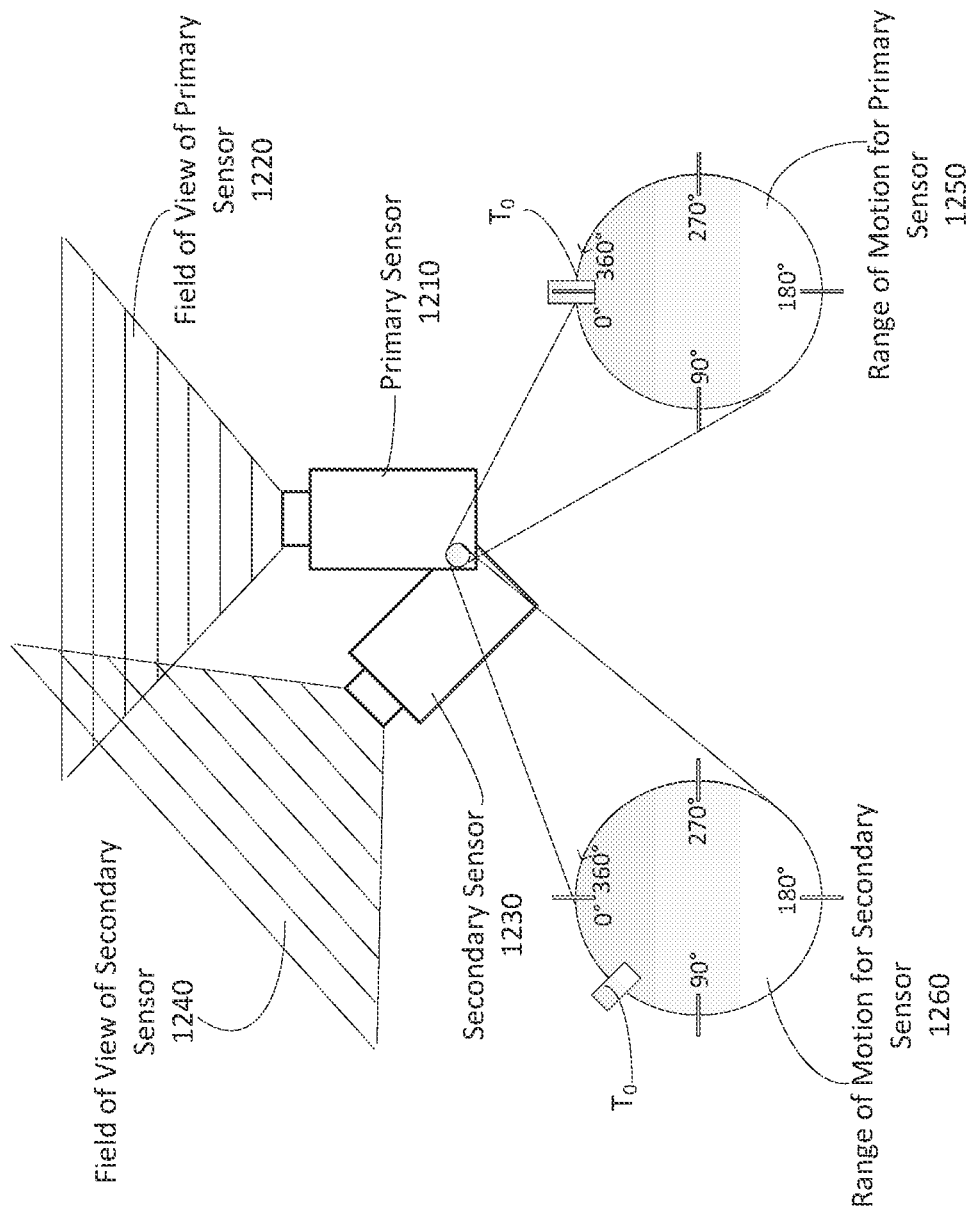
FIG. 12 illustrates an example configuration of a primary sensor and a secondary sensor at different initial orientations, according to an embodiment.

FIG. 12 illustrates an example configuration of a primary sensor and a secondary sensor at different initial orientations, according to an embodiment. Although FIG. 12 shows the primary sensor 1210 and the secondary sensor 1230 located close to each other, the sensors may be located at locations on the vehicle that are separated by a threshold distance. A primary sensor 1210 is associated with a field of view 1220 of the primary sensor and a secondary sensor 1230 is associated with a field of view 1240 of the secondary sensor. For the sake of simplicity, FIG. 12 describes a configuration in which both sensors rotate at the same frequency, however it is understood that the configuration may also describe sensors which do not rotate at the same frequency. Both the primary sensor 1210 and the secondary sensor 1230 rotate about a vertical axis through a complete range of motion, for example the illustrated ranges of motion 1250 and 1260. In the illustrated embodiment, the primary sensor 1210 begins at an initial orientation ($T_0$), or reference angle, of 0° whereas the secondary sensor 1220 begins at an initial orientation ($T_0$) between 0° and 90°, for example 45°. As a result a full rotation of the primary sensor 1210 would carry the primary sensor from 0° to 360°, whereas the secondary sensor 1220 would be carried from and to the 45° marker. Although the fields of view 1220 of the primary sensor and the secondary sensor 1240 as illustrated in FIG. 12 overlaps in a portion of the field of view, over a full rotation, each sensor records a 360° view of the surrounding environment. Geometrically, the offset between the two sensors is 45° and, therefore, features recorded at a position in the primary scan data will be accordingly shifted in the secondary scan data.

In order to calibrate the two sensors, the HD map system determines a relative transform that aligns the two sets of scan data. In one embodiment, the relative transform aligns primary scan data with secondary scan data based on six degrees of freedom, for example shifts over an x-axis, a y-axis, and the z-axis, and three rotational axes (i.e., yaw, pitch, and roll). In one configuration, a primary sensor and a secondary sensor may be mounted on a vehicle at different location on the vehicle, thereby differing in their coordinates along the x, y, and z-axes and oriented differently along the rotational axes. The relative transform maps points within the scan data recorded by the primary sensor to scan data recorded by the secondary sensor which calibrates the orientation and position of the primary and secondary sensor over the six degrees of freedom. For example, a primary sensor may record a traffic light at a first position whereas a secondary sensor may record the same traffic light at a different, second position. The relative transform identifies that traffic light in both segments of scan data and maps the first position to the second position to align the secondary scan data with the primary scan data before aggregating the scan data into an aggregate point cloud.

Figure 13:
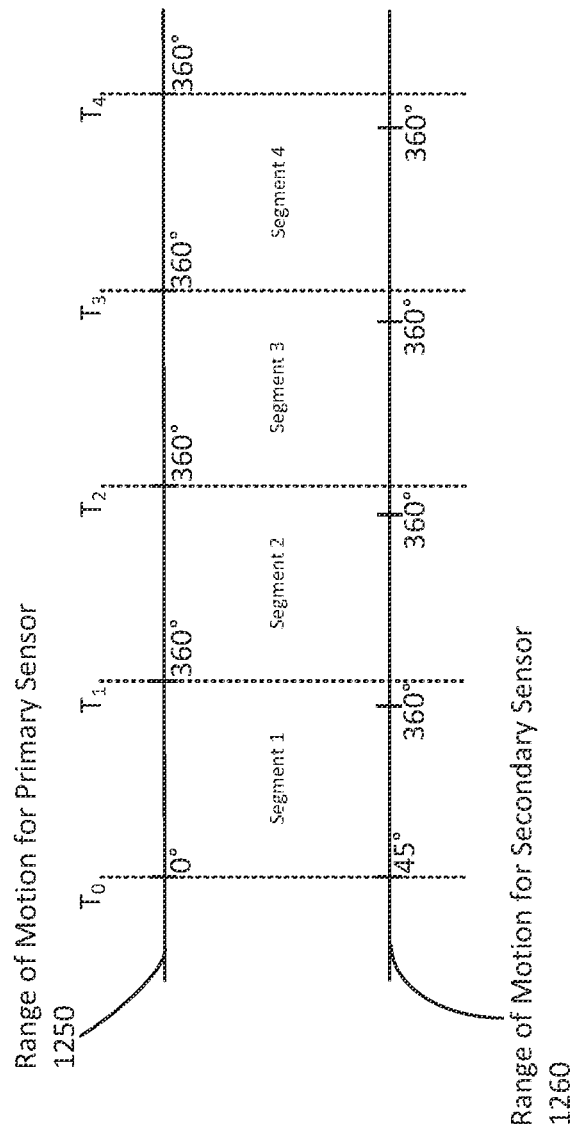
FIG. 13 illustrates a representation of the calibration of a primary sensor and a secondary sensor based on timestamps, according to an embodiment.

However, before determining the relative transform based on a comparison of scan data, the scan data segmenting module 940 organizes secondary scan data into segments based on timestamps used to segment the primary scan data. Each of the resulting segments describes a complete rotation of both the primary sensor and the secondary sensor but accounts for the orientation offset between the primary sensor and the secondary sensor. By segmenting secondary scan data based on the same boundary conditions (e.g., the scan-start time and scan-end time) as the primary scan data, the system ensures that the environment being compared between the two segments is the same environment. Continuing from the exemplary configuration of FIG. 12, FIG. 13 illustrates a representation of the calibration of a primary sensor and a secondary sensor as a function of time, according to an embodiment. Compared to FIG. 12, FIG. 13 describes alternative representations of the range of motion 1250 for the primary sensor and the range of motion 1260 for the secondary sensor. The scan-start time for rotations of both the primary sensor 1210 and the secondary sensor 1220 are labeled using $T_0$. As described with reference to FIG. 12, at $T_0$, the primary sensor is oriented at 0° and the secondary sensor is oriented at 45°. As the primary sensor 1210 passes the reference angle, the primary sensor rotation tracker 930 records the scan-end time of the current rotation/scan-start time of the following rotation ($T_1$). Accordingly, the scan data segmenting module 940 generates a first segment between $T_0$ and $T_1$ which represents the 360° rotations of the primary sensor from the initial 0° orientation and the secondary sensor from the initial 45° orientation. Having accounted for the initial 45° offset in the first segment, the scan data segmenting module 940 continues to receive scan-start times from the primary sensor rotation tracker 930 and identifies secondary scan data associated with a matching timestamp to generate the second, third, and fourth segments as illustrated.

In embodiments in which the primary sensor and secondary sensor have equivalent rotational frequencies, the scan data segmenting module 940 may detect that the secondary scan data has completed a full rotation and returned to the 45° initial starting point. Accordingly, the scan data segmenting module 940 identifies the secondary scan data recorded at the subsequent 45° orientation and labels it with the timestamp $T_1$. In alternate embodiments, the secondary sensor may assign timestamps to the scan data in real time such that the scan data segmenting module 940 identifies secondary scan data with a timestamp matching $T_1$ to generate a segment.

Figure 14:
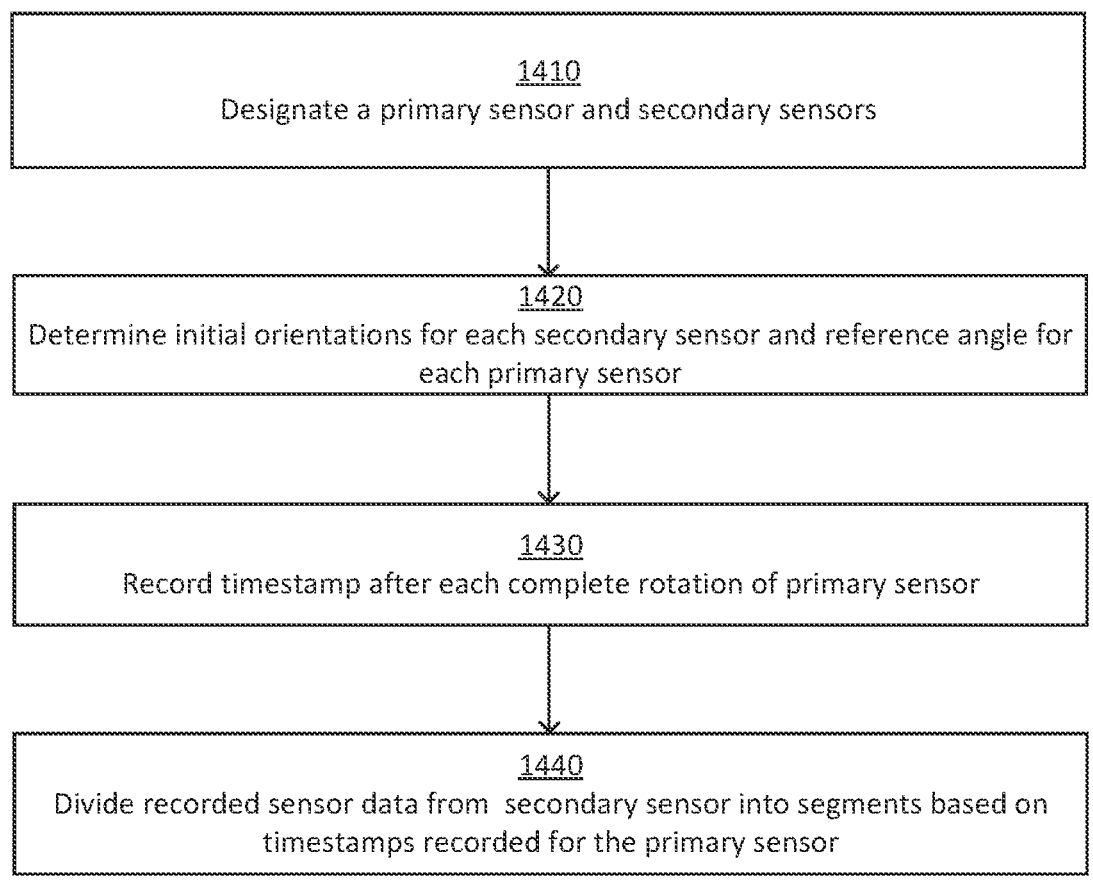
FIG. 14 illustrates a flow chart of the process for dividing secondary scan data into segments, according to an embodiment.

FIG. 14 illustrates a flow chart of the process for dividing secondary scan data into segments, according to an embodiment. The calibration module 260 designates 1410 a primary sensor and one or more secondary sensors, for example, using the techniques described above with reference to FIG. 11. The calibration module 260 determines 1420 initial orientations, or angles, for each secondary sensor mounted to the autonomous vehicle and a reference angle for the primary sensor. In one embodiment, for each secondary sensor, the calibration module 260 determines an initial angle relative to a stationary object in the surrounding environment. In an alternative embodiment, the calibration module 260 identifies the initial angle of each secondary sensor relative to the reference angle of the primary sensor which may be designated as 0°. As the primary sensor completes a rotation by passing the reference angle, the primary sensor records 1430 a timestamp (e.g., a scan-start time). Similarly, each secondary sensor continuously records timestamps as the secondary sensor moves through a complete rotation. The scan data segmenting module 940 divides 1440 recorded sensor data from each secondary sensor (e.g., secondary scan data) into segments based on the timestamps (e.g., scan-start time or scan-start time and scan-end time) recorded for the primary sensor. In one embodiment, the segments are divided by matching the scan-start time of the primary sensor to the timestamps assigned to the secondary scan data.

In one embodiment, the segment of primary scan data is generated by the scan data segmenting module 940 in near-real time as the primary scan data is recorded. Comparatively, the segment of secondary scan data may be recorded after a delay of time during which the scan-start time and scan-end time are recorded and communicated to either the scan-data segmenting modules 940 or each of the secondary sensors, depending on the embodiment. As a result, secondary scan data is continuously recorded and stored in the secondary scan data store 920 until the scan-start time and the scan-end time are received from the primary sensor. The processing time required to determine and communicate the scan-start time and the scan-end time is small and, as a result, the required computer storage space of the secondary scan data store 920 is also small.

FIG. 15 illustrates a flow chart of the process for receiving and storing primary scan data, according to an embodiment. The calibration module 260 receives 1510 a timestamp representing a scan-start time of the primary sensor based on a reading that the primary sensor has rotated past a reference angle. In other embodiments, the calibration module 260 may detect that the primary sensor has rotated past the reference angle and record the scan-start time. Upon receipt of the scan-start time, the scan-data segmenting module 940 receives a continuous feed of primary scan data from the primary sensor and initializes 1520 a segment using the primary scan data. The scan data segmenting module 940 updates 1530 the initialized segment with primary scan data recorded by the primary sensor. If the rotation tracker 930 does not receive 1540 an indicating that the primary sensor has completed a full rotation, the scan data segmenting module 940 continues adding the primary scan data to the segment. If the rotation tracker 930 receives 1540 an indication that the primary sensor has completed a full rotation by rotating past the reference angle, the rotation tracker 930 records a scan-end time. If scan data segmenting tracker 940 receives the scan-end time, the scan data segmenting tracker 940 concludes the current segment by indicating a completion of the primary scan data. In some embodiments, the scan data segmenting module 940 starts aggregating scan data for a subsequent segment. The completed segment is stored 1550 in the primary sensor data store 910 and may be received by the alignment module 950.

Figure 16:
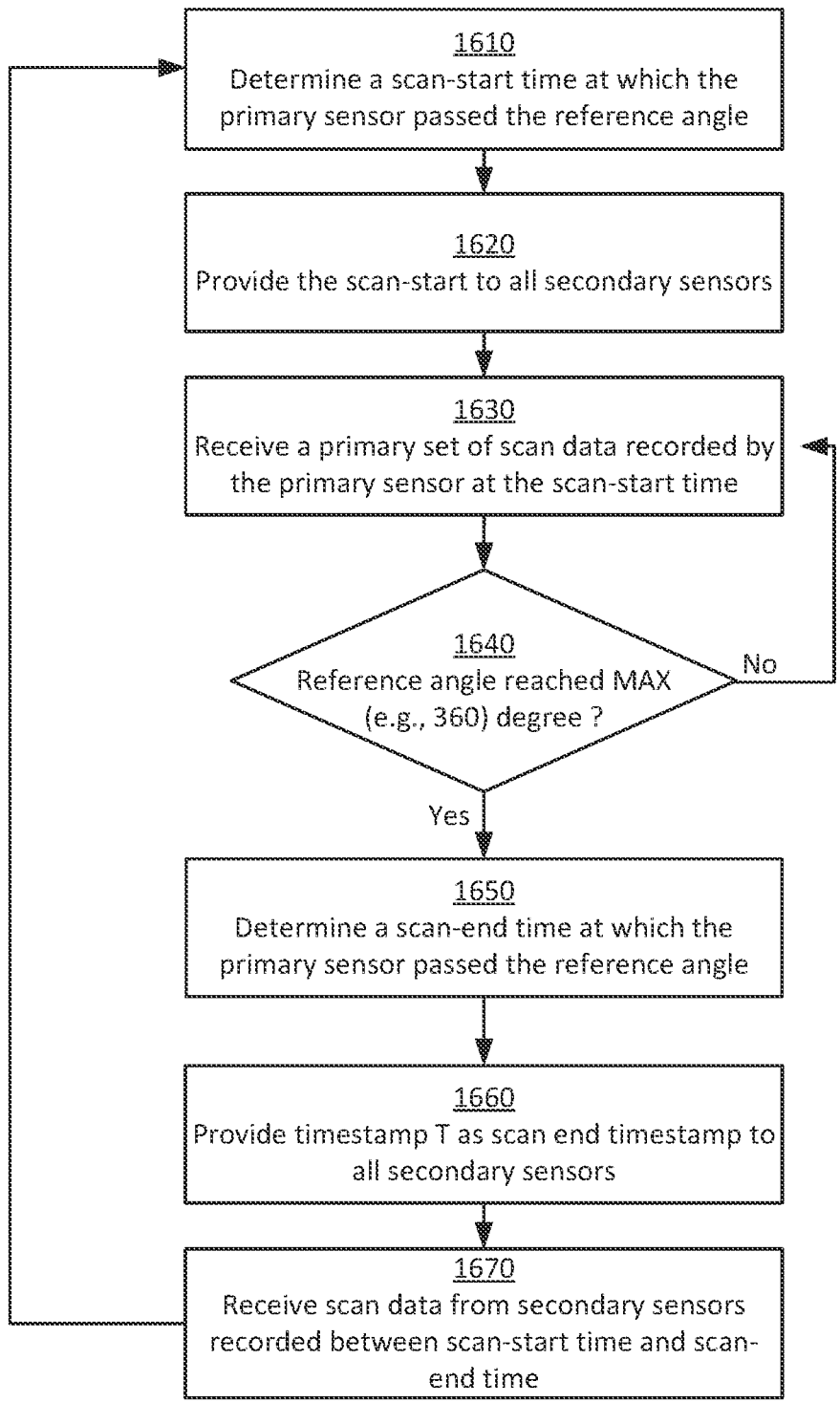
FIG. 16 illustrates a flow chart of the process for dividing primary scan data and secondary scan data into segments by primary and secondary sensors, according to an embodiment.

FIG. 16 illustrates a flow chart of the process for dividing primary scan data and secondary scan data into segments by primary and secondary sensors, according to an embodiment. The primary sensor rotation tracker 930 determines 1610 a scan-start time at which the primary sensor rotates past the reference angle. The calibration module 260 provides 1620 the scan-start time to each of the secondary sensors. In an alternate embodiment, the scan-start time is communicated to the scan data segmenting module 940 to be applied to scan data received from each of the secondary sensors. The alignment module 950 receives 1630 a segment of primary scan data recorded by the primary sensor from the scan-start time. In some embodiments, the alignment module 950 receives a stream of scan data recorded by the primary sensor. Until the primary sensor rotates 1640 past the reference angle to complete a rotation, the alignment module 950 continues to receive 1630 primary scan data from the primary sensors. If the primary sensor rotates 1640 past the reference angle to complete a rotation, the primary sensor rotation tracker 930 determines 1650 a scan-end time at which the primary sensor completes the rotation by passing the reference angle. In some embodiments, the scan-end time is stored as the scan-start time of the rotation that immediately follows the current rotation. The primary sensor rotation tracker 930 records and provides 1660 a timestamp indicating the scan-start time and a timestamp indicating the scan-end time to each secondary sensor. In one embodiment, the secondary sensor generates a segment of scan data based on the received scan-end time. The end of a first segment of scan data based on the received scan-end time may simultaneously represent the start of a second segment. The alignment module 950 receives 1670 segments of secondary scan data from secondary sensors recorded between the scan-start time and the scan-end time from each secondary sensor. In some embodiments, a scan-start time and a scan-end time is received by the scan data segmenting module 940 which generates a segment of secondary scan data.

Alignment of Primary Scan Data and Secondary Scan Data

Figure 17A:
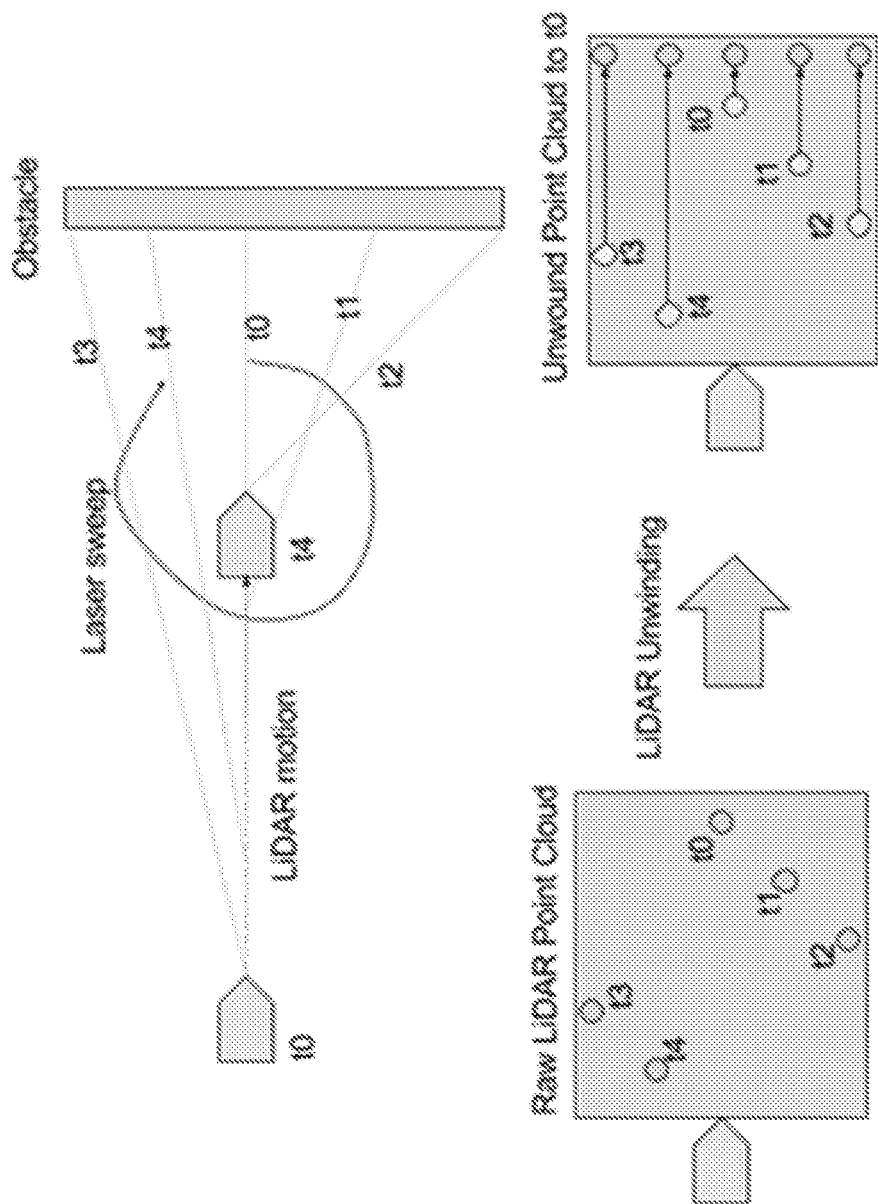
FIG. 17A illustrates the process of unwinding a point cloud, for example, a point cloud generated by a LIDAR, according to an embodiment.

In some embodiments, the recording of the primary and secondary sensors undergo an unwinding process. For example, if the primary and secondary sensors are LIDAR sensors record point cloud representations of the environment and unwind the point clouds recorded by each sensor. FIG. 17A illustrates the process of unwinding a point cloud, for example, a point cloud generated by a LIDAR, according to an embodiment. The raw data packages received from LiDAR can be used to create a point cloud based on the assumption the sensor itself does not change its location during the course of the LiDAR scan. This assumption is not true since the LiDAR is mounted on a moving vehicle. For example, the vehicle may be traveling at 65 mile per hour speed. Accordingly, a LiDAR sampling at 10 HZ can travel up to 3.5 m during each scan. Therefore, embodiments transform the point cloud data using an unwinding transform that compensates for the motion of the LiDAR and transforms the raw data packages to a point cloud that is consistent with the real world.

To recover the true 3D point cloud of the surrounding environment relative to the LiDAR's location at a specific timestamp, the HD map system compensates the LiDAR's motion during the course of scanning the environment. This motion compensation operation is referred to as "unwinding" and the transform applied for unwinding is referred to as the unwinding transform.

Assume the motion the LiDAR moved during the scan as T. Since LiDAR beams can be identified via its row and column index in the rage image, the HD map system can derive the relative timing of each LiDAR beam relative to the starting time of the scan. Using a linear motion interpolation, the HD map system moves each LiDAR beam according to its interpolated motion relative to the starting time. After adding this additional motion compensation to each LiDAR beam, the HD map system recovers the static world environment as an unwound point cloud. In alternate embodiments, any other motion model may be implemented, for example a Kalman filter.

There are three ways to estimate the LiDAR's relative motion (T), i.e., the unwinding transform, during the course of each scan: (1) Using GPS-IMU, (2) Run pairwise point cloud registration using raw, consecutive LiDAR point clouds, (3) Performing a global alignment of various point clouds and computing the relative transform from the adjacent LiDAR poses.

To align primary scan data and secondary scan data, the alignment module may identify features shared between the segment of primary scan data and the corresponding segment of secondary scan data. In embodiments in which the primary sensor and secondary sensors are LIDAR sensors, the alignment module aligns the point cloud representations of the scan data using iterative closest point techniques. For secondary sensors with an equivalent processing frequency as the primary sensor, each feature present in the segment recorded by the primary sensor is also present in the segment recorded by the secondary sensor. However, the organization in which the features are present in the segments may differ. For example, the segment recorded by a primary sensor rotating from left to right (e.g., from 0° to 360° may record a pine tree, followed by a house, followed by an oak tree. However, the segment recorded by a secondary sensor oriented at 45° also rotating from left to right (e.g., from 45° to 405°) may record the house, followed by the oak tree, followed by the pine tree. The alignment module 950 receives both segments and aligns them by overlapping the features (e.g., the pine tree, the house, and the oak tree) to align the segments. Based on the overlapping representation, the alignment module 950 determines a relative transform between the segment of primary scan data and the segment of secondary scan data.

In alternate embodiments, the primary sensor and secondary sensor rotate at different frequencies, for example the primary sensor may rotate at a faster frequency than a secondary sensor. FIG. 17B illustrates a representation of two segments of scan data recorded by sensors rotating at different rotational frequencies, according to an embodiment. The scan 1710 recorded by the primary sensor rotating from left to right includes a representation of a first tree, followed by a house, a followed by a second tree. Comparatively, the scan 1750 recoded by the secondary sensor rotating from left to right at a slower frequency includes a representation of only a part of the house and a second tree. Because the rotational frequency of the secondary sensor is less than the rotational frequency of the primary sensor, in the time required for the primary sensor to complete a full rotation, the secondary sensor may only complete a fraction of the rotation. As a result, one or more features may be absent from the segment 1750 compared the segment 1710.

Compared to embodiments in embodiments in which the primary and secondary sensors share a common rotation frequency, the alignment module may only be able to overlap a portion of the two segments. FIG. 18 illustrates an example alignment of two segments of scan data recorded by sensors rotating at different rotational frequencies, according to an embodiment. The alignment module 950 identifies shared features between the two segments and uses iterative closest point techniques to map each feature from the segment 1710 recorded by the primary sensor to the corresponding feature of the segment 1710 recorded by the secondary sensor. Shared features, as illustrated in FIG. 18, include, but are not limited to the vertices of the rooftop of the house, the leaves of the second tree, the trunk of the second tree, the left window of the house, and the door of the house. The alignment module 950 aligns the shared features resulting in the aligned point cloud representation 1800 such that only a portion of the segment 1710 and the segment 1750 overlap. The alignment module 950 determines the relative transform between the two segments based on the overlap between the shared features.

In one embodiment, the relative transform is a rigid three-dimensional transformation consisting of a rotation based on the rotational axes (e.g., pitch, yaw, and roll) and a translation based on the x, y, and z-axis. The rotational may be represented as a 3×3 matrix and the translation may be represented as a 3×1 matrix. For example, the relative transform may follow the equation:

$$[x_A]_{3\times 1} = [R]_{3\times 3} \times [x_B]_{3\times 1} + [t]_{3\times 1}$$

Where $X_A$ represents a 3×1 matrix of points from the primary scan data, $X_B$ represents a 3×1 matrix of points from the secondary scan data, R represents a 3×3 rotation matrix representing the rotation from a coordinate system of the secondary scan to a coordinate system of the primary scan, and t represents a 3×1 matrix representing the translation between the two sensors.

Computing Machine Architecture

Figure 19:
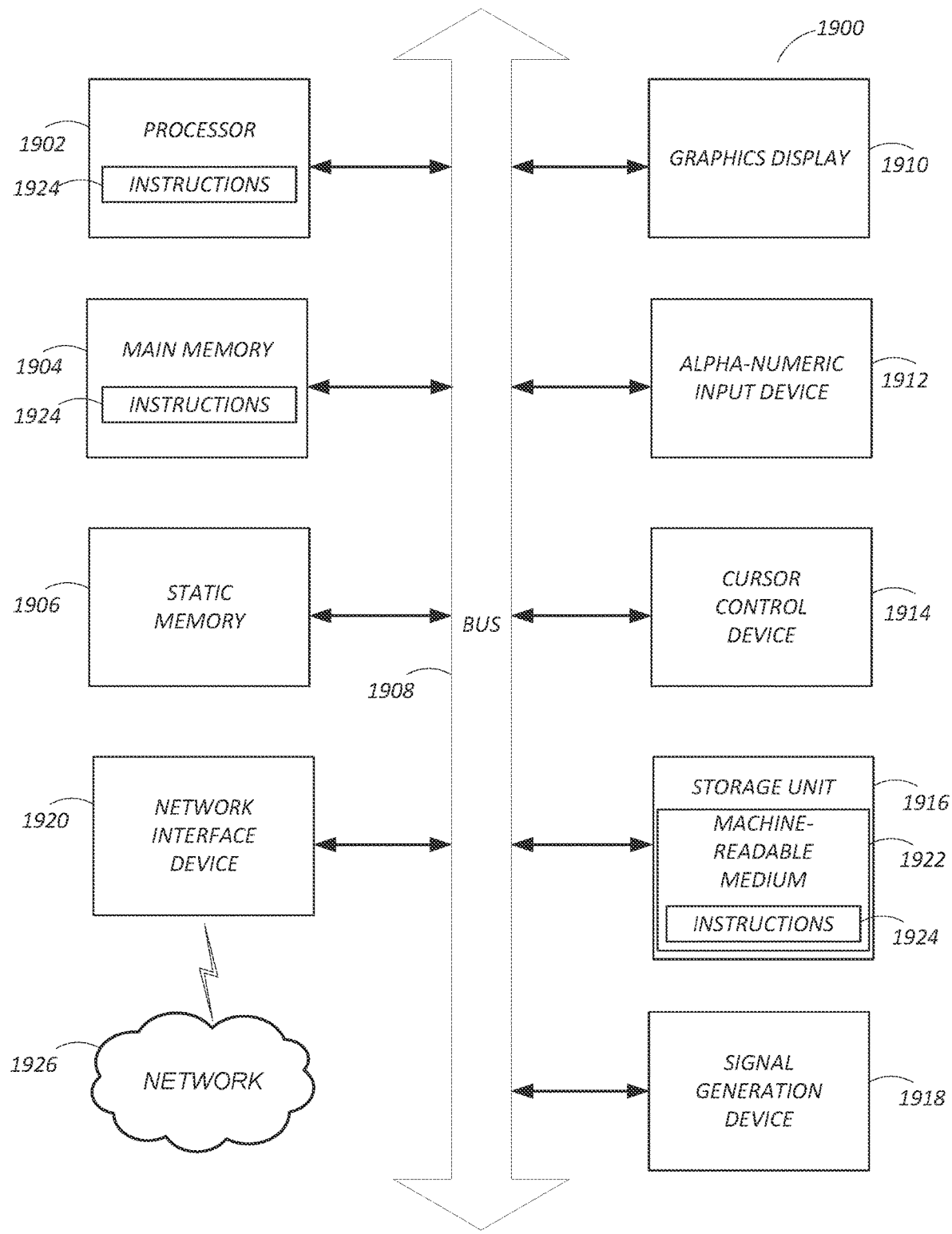
FIG. 19 is a block diagram illustrating components of an example machine able to read instructions from a machine-readable medium and execute them in a processor (or controller), according to an embodiment.

FIG. 19 is a block diagram illustrating components of an example machine able to read instructions from a machine-readable medium and execute them in a processor (or controller), according to an embodiment. Specifically, FIG. 19 shows a diagrammatic representation of a machine in the example form of a computer system 1900 within which instructions 1924 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1924 (sequential or otherwise) that specify actions to be taken by that machine. Further, while only a single machine is illustrated, the term "machine" shall also be taken to include any collection of machines that individually or jointly execute instructions 1924 to perform any one or more of the methodologies discussed herein.

The example computer system 1900 includes a processor 1902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1904, and a static memory 1906, which are configured to communicate with each other via a bus 1908. The computer system 1900 may further include graphics display unit 1910 (e.g., a plasma display panel (PDP), a liquid crystal display (LCD), a projector, or a cathode ray tube (CRT)). The computer system 1900 may also include alphanumeric input device 1912 (e.g., a keyboard), a cursor control device 1914 (e.g., a mouse, a trackball, a joystick, a motion sensor, or other pointing instrument), a storage unit 1916, a signal generation device 1918 (e.g., a speaker), and a network interface device 1920, which also are configured to communicate via the bus 1708.

The storage unit 1916 includes a machine-readable medium 1922 on which is stored instructions 1924 (e.g., software) embodying any one or more of the methodologies or functions described herein. The instructions 1924 (e.g., software) may also reside, completely or at least partially, within the main memory 1904 or within the processor 1902 (e.g., within a processor's cache memory) during execution thereof by the computer system 1900, the main memory 1904 and the processor 1902 also constituting machine-readable media. The instructions 1924 (e.g., software) may be transmitted or received over a network 1926 via the network interface device 1920.

While machine-readable medium 1922 is shown in an example embodiment to be a single medium, the term "machine-readable medium" should be taken to include a single medium or multiple media (e.g., a centralized or distributed database, or associated caches and servers) able to store instructions (e.g., instructions 1924). The term "machine-readable medium" shall also be taken to include any medium that is capable of storing instructions (e.g., instructions 1924) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A system comprising:
one or more processing units to perform operations comprising:
obtaining a first set of scan data recorded using a first sensor mounted on a vehicle over a time interval, the time interval determined based at least on a reference orientation of the first sensor;
obtaining a second set of scan data recorded using a second sensor mounted on the vehicle over the time; and
calibrating the first sensor with respect to the second sensor based at least on an alignment determined between the first set of scan data and the second set of scan data.

2. The system of claim 1, wherein the time interval is determined based at least on a scan start time and a scan end time of the first sensor.

3. The system of claim 1, wherein the reference orientation of the first sensor is a reference angle of the first sensor.

4. The system of claim 1, wherein the operations further comprise selecting the first sensor as a reference sensor and selecting the second sensor as a secondary sensor such that the time interval is based at least on a scanning time of the first sensor.

5. The system of claim 4, wherein the first sensor is selected as the reference sensor based at least on a comparison between a first scanning frequency of the first sensor and a second scanning frequency of the second sensor.

6. The system of claim 5, wherein the first sensor is selected as the reference sensor based at least on the first scanning frequency being slower than the second scanning frequency.

7. The system of claim 5, wherein the first sensor is selected as the reference sensor based at least on the first scanning frequency being closer than the second scanning frequency to a localization processing frequency.

8. The system of claim 1, wherein the obtaining the second set of scan data includes selecting scan data from a history of scan data of the second sensor that corresponds to the time interval.

9. A method comprising:
determining a time interval that corresponds to a scan start time and a scan end time of a first sensor mounted on a vehicle based at least on the first sensor being selected as a reference sensor, the first sensor being selected based at least on a comparison between one or more first properties corresponding to the first sensor and one or more second properties corresponding to a second sensor mounted on the vehicle;

obtaining a first set of scan data recorded using the first sensor over the time interval;

obtaining a second set of scan data recorded using the second sensor over the time interval; and calibrating the first sensor with respect to the second sensor based at least on an alignment determined between the first set of scan data and the second set of scan data.

10. The method of claim 9, wherein the scan start time and the scan end time are determined based at least on a reference orientation of the first sensor.

11. The method of claim 10, wherein the reference orientation is determined based at least on a reference angle of the first sensor.

12. The method of claim 9, wherein:
the one or more first properties include a first scanning frequency of the first sensor; and
the one or more second properties include a second scanning frequency of the second sensor.

13. The method of claim 12, wherein the first sensor is selected as the reference sensor based at least on the first scanning frequency being slower than the second scanning frequency.

14. The method of claim 12, wherein the first sensor is selected as the reference sensor based at least on the first scanning frequency being closer than the second scanning frequency to a localization processing frequency.

15. The method of claim 9, wherein the obtaining the second set of scan data includes selecting scan data from a history of scan data of the second sensor that corresponds to the time interval.

16. A system comprising:
one or more processing units to perform operations comprising:

selecting a first sensor mounted on a vehicle as a primary sensor and a second sensor mounted on the vehicle as a secondary sensor based at least on a comparison between a first scanning frequency of the first sensor and a second scanning frequency of the second sensor;

aligning a first set of scan data recorded using the first sensor with a second set of scan data recorded using the second sensor over a time interval, the time interval being determined based at least on a scan of the first sensor in response to the first sensor being selected as the primary sensor; and calibrating the first sensor with respect to the second sensor based at least on the aligning.

17. The system of claim 16, wherein the first sensor is selected as the primary sensor based at least on one or more of:

the first scanning frequency being slower than the second scanning frequency, or the first scanning frequency being closer than the second scanning frequency to a localization processing frequency.

18. The system of claim 16, wherein the time interval is determined based at least on a reference orientation of the first sensor.

* * * * *